US012526202B2

(12) United States Patent
Wang et al.

(10) Patent No.: US 12,526,202 B2
(45) Date of Patent: Jan. 13, 2026

(54) END-TO-END DEEP NEURAL NETWORK ADAPTATION FOR EDGE COMPUTING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 504 days.

(21) Appl. No.: 17/998,323

(22) PCT Filed: May 21, 2021

(86) PCT No.: PCT/US2021/033645
§ 371 (c)(1),
(2) Date: Nov. 9, 2022

(87) PCT Pub. No.: WO2021/247254
PCT Pub. Date: Dec. 9, 2021

(65) Prior Publication Data
US 2023/0344725 A1 Oct. 26, 2023

Related U.S. Application Data

(60) Provisional application No. 63/035,380, filed on Jun. 5, 2020.

(51) Int. Cl.
*H04L 41/16* (2022.01)
*G06N 3/0442* (2023.01)
(Continued)

(52) U.S. Cl.
CPC .......... *H04L 41/16* (2013.01); *G06N 3/0442* (2023.01); *H04L 47/18* (2013.01); *H04L 67/10* (2013.01); *H04W 84/042* (2013.01)

(58) Field of Classification Search
CPC ......... H04L 41/16; H04L 47/18; H04L 67/10; H04L 2012/5686; G06N 3/0442;
(Continued)

(56) References Cited

U.S. PATENT DOCUMENTS

2019/0113917 A1\* 4/2019 Buch ........................ G06N 3/00
2019/0116560 A1    4/2019 Naderializadeh et al.
(Continued)

FOREIGN PATENT DOCUMENTS

WO    2017004574    1/2017
WO    2019104280    5/2019
(Continued)

OTHER PUBLICATIONS

"Foreign Office Action", IN Application No. 202247072330, Jan. 30, 2023, 6 pages.
(Continued)

*Primary Examiner* — Michael A Keller
(74) *Attorney, Agent, or Firm* — Colby Nipper PLLC

(57) ABSTRACT

Techniques and apparatuses are described for adapting an end-to-end, E2E, machine-learning, ML, configuration for processing communications transferred through an E2E communication. A network entity directs a user equipment (UE) and a base station participating in the E2E communication to implement the E2E communication by forming at least a portion of an E2E deep neural network, DNN, based on a first E2E ML configuration. The network entity determines to update the first E2E ML configuration based on a change in a participation mode of an edge compute server (ECS) in the E2E communication. The network entity identifies a second E2E ML configuration based on the change in participation mode and directs the UE or the base station to update the portion of the E2E DNN using the second E2E ML configuration.

20 Claims, 11 Drawing Sheets

(51) Int. Cl.
*H04L 47/10* (2022.01)
*H04L 67/10* (2022.01)
*H04W 84/04* (2009.01)

(58) Field of Classification Search
CPC .......... G06N 3/045; G06N 3/063; G06N 3/08; H04W 84/042; H04W 24/02
See application file for complete search history.

(56) References Cited

U.S. PATENT DOCUMENTS

| | | | |
|---|---|---|---|
| 2019/0138934 A1 | | 5/2019 | Prakash et al. |
| 2019/0387448 A1 * | | 12/2019 | Stauffer .......... H04W 36/00835 |
| 2020/0272899 A1 | | 8/2020 | Dunne et al. |
| 2021/0049451 A1 | | 2/2021 | Wang et al. |

FOREIGN PATENT DOCUMENTS

| | | | | |
|---|---|---|---|---|
| WO | 2019211134 | | 11/2019 | |
| WO | WO-2019211134 A1 * | | 11/2019 | ............. G06N 20/00 |
| WO | 2020171803 | | 8/2020 | |
| WO | 2021247254 | | 12/2021 | |

OTHER PUBLICATIONS

"International Preliminary Report on Patentability", Application No. PCT/US2021/033645, Dec. 6, 2022, 13 pages.

"3rd Generation Partnership Project; Technical Specification Group Services and System Aspects; Study on application architecture for enabling Edge Applications; (Release 17)", 3GPP TR 23.758 V17.0.0, Dec. 2019, 113 pages.

"International Search Report and Written Opinion", Application No. PCT/US2021/033645, Sep. 16, 2021, 17 pages.

Chen, et al., "Deep Learning With Edge Computing: A Review", Aug. 2019, 21 pages.

Dorner, et al., "Deep Learning-Based Communication Over the Air", Jul. 11, 2017, 11 pages.

Jeong, et al., "IONN: Incremental Offloading of Neural Network Computations from Mobile Devices to Edge Servers", Oct. 2018, pp. 401-411.

Wang, et al., "Adaptive Parallel Execution of Deep Neural Networks on Heterogeneous Edge Devices Convergence of Edge Computing and Deep Learning: A Comprehensive Survey", Jan. 28, 2020, 36 pages.

* cited by examiner

END-TO-END DEEP NEURAL NETWORK ADAPTATION FOR EDGE COMPUTING

RELATED APPLICATION(S)

This application is a national stage entry of International Application No. PCT/US2021/033645, filed May 21, 2021, which claims the benefit of U.S. Provisional Application No. 63/035,380, filed Jun. 5, 2020, the disclosures of which are incorporated herein by reference in their entirety.

BACKGROUND

The evolution of wireless communication systems often stems from a demand for higher data throughput and lower latency. As one example, the demand for data increases as more and more devices gain access to wireless communication systems. Evolving devices also execute data-intensive and/or computation-intensive applications that utilize and/or process more data than previous applications, such as higher-refresh-rate streaming video applications, higher-resolution social media applications, multi-player gaming applications, higher-fidelity audio services, etc. To accommodate the increased data usage and to provide more computing power, evolving wireless communication systems incorporate additional computing devices and/or data storage resources.

As one example, mobile edge computing corresponds to computing applications, capabilities, and/or services deployed at the edge of a wireless network, such as a coverage area for a fifth generation (5G) and/or sixth generation (6G) wireless network. Relative to cloud-based services accessed through the Internet, mobile edge computing provides computing resources local to a base station, and subsequently a user equipment (UE) in communication with the base station. The locality of the edge computing improves the network response times by reducing data transfer latencies.

The wireless network sometimes migrates a UE between an edge compute server (ECS) and a cloud-based service for application processing. To illustrate, consider a UE operating within a wireless network. As the UE moves to a first coverage area with an available ECS, the wireless network may determine to utilize the computing resources provided by the ECS for UE application processing. However, as the UE moves away from the coverage area and/or the ECS, the wireless network must redirect the UE application processing to a different ECS and/or a cloud-based service. Thus, edge computing can add complexity as the wireless network dynamically redirects application processing between edge computing and cloud-based services.

SUMMARY

This document describes techniques and apparatuses for end-to-end (E2E) deep neural network (DNN) adaptation for edge computing. Various aspects describe adapting an end-to-end, E2E, machine-learning, (ML) configuration that forms an E2E deep neural network (DNN) for processing communications transferred through an E2E communication. A network entity directs a user equipment (UE) and a base station participating in the E2E communication to implement the E2E communication by forming at least a portion of an E2E DNN based on a first E2E ML configuration. The network entity determines to update the first E2E ML configuration based on a change in a participation mode of an edge compute server (ECS) in the E2E communication. The network entity identifies a second E2E ML configuration based on the change in participation mode and directs the UE or the base station to update the portion of the E2E DNN using the second E2E ML configuration.

In aspects, a UE adapts an E2E ML configuration for processing communications transferred through an E2E communication. The UE forms a deep neural network (DNN) using at least a first portion of a first E2E ML configuration for an E2E DNN that implements an E2E communication. The UE receives an indication to update the DNN using at least a second portion of a second E2E ML configuration based on a change in a participation mode of an edge compute server (ECS) in the E2E communication. The UE then updates the DNN using the at least a second portion of the E2E ML configuration based on the participation mode of the ECS and implements at least a portion of the E2E communication using the updated DNN.

The details of one or more implementations of E2E DNN adaptation for edge computing are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of end-to-end (E2E) deep neural network (DNN) adaptation for edge computing are described below. The use of the same reference numbers in different instances in the description and the figures indicate similar elements.

DETAILED DESCRIPTION

Figure 1:
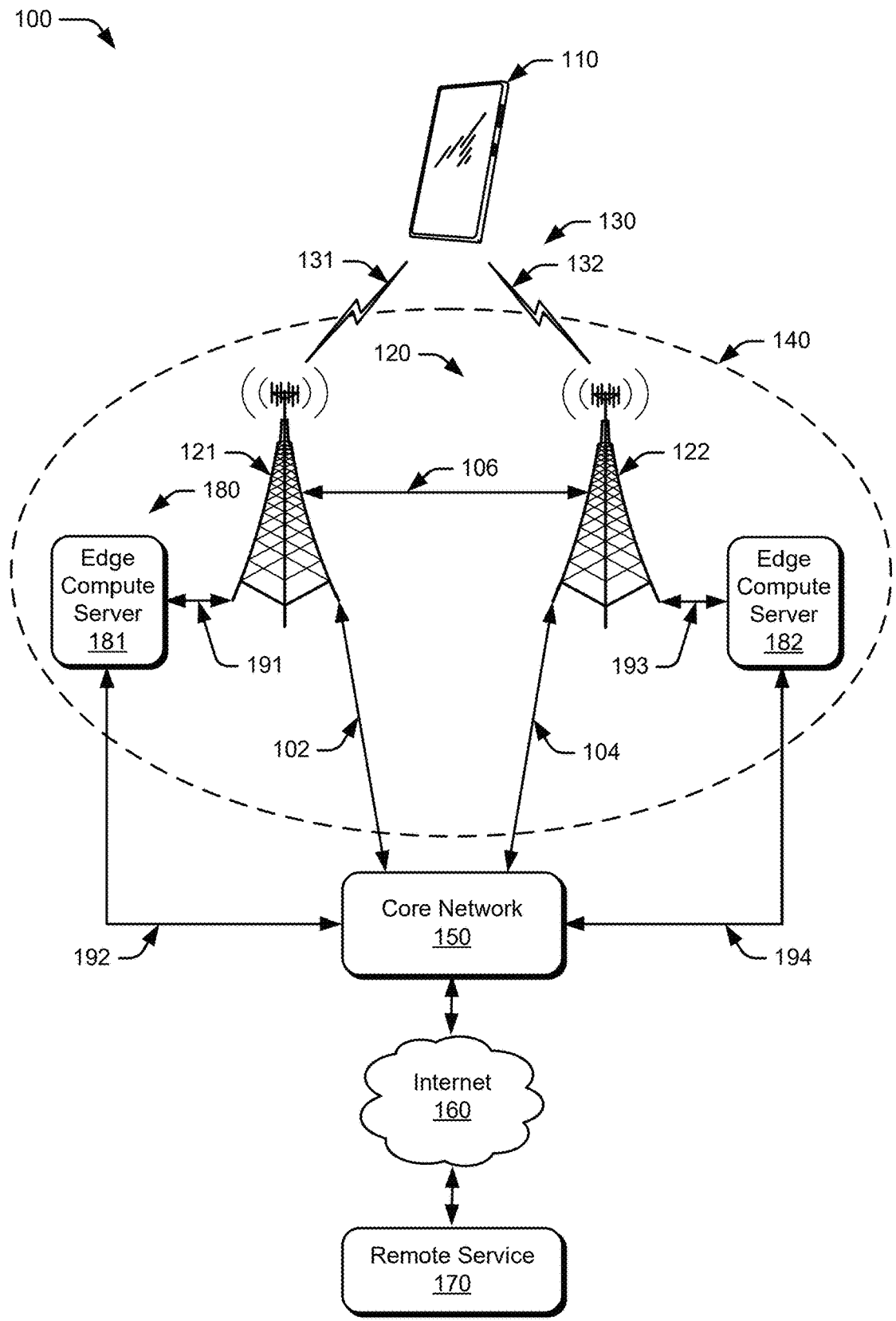
FIG. 1 illustrates an example environment in which various aspects of E2E DNN adaptation for edge computing can be implemented.

Edge computing, sometimes known as mobile edge computing (MEC), provides wireless networks with an ability to improve communications with a user equipment (UE) by using edge compute servers (ECSs) to provide additional computing resources and/or reduce data transfer latencies. As one example, a base station in a wireless network can connect to an ECS and provide edge computing services to UEs to improve data transfer latencies. To illustrate, the close proximity of the ECS to a target device, relative to the proximity of a remote service or a data center, helps improve the responsiveness of the wireless network by reducing data transfer latencies with the UE. The reduced latencies help improve the performance and responsiveness of various applications accessing the resources provided by edge computing, such as gaming applications, augmented reality (AR) applications, virtual reality (VR) applications, vehicle applications (e.g., road information, weather applications), real-time drone detection, and data analytics.

Device mobility adds complexity to managing edge computing resources. To illustrate, as a UE moves into a first coverage area of a first base station connected to an ECS, the wireless network can incorporate edge computing for processing application data of the UE. As the UE moves away from the first coverage area and into a second coverage area of a second base station without an ECS, the wireless network has to redirect the application data to a cloud-based service.

DNNs provide solutions to complex processing, such as the functionality associated with supporting the changing participation (e.g., added, omitted, aggregated with cloud-based services) of edge computing in an E2E communication, such as a data session over a wireless network with a UE. Various aspects train a DNN how to process communications transferred through an E2E communication based on a participation mode of edge computing in the E2E communication. A wireless network can then direct devices participating in the E2E communication to form or update an E2E DNN as the participation mode of edge computing in the E2E communication changes. In some aspects, the wireless network dynamically reconfigures the E2E DNN, such as by modifying various parameter configurations (e.g., coefficients, kernel sizes, weights) and/or various architecture configurations and/or layer computation modes (e.g., adding convolutional layers, reducing a number of convolutional layers, increasing or decreasing down-sampling of data performed by the layer, reducing a number of fully connected layers, increasing a number of fully connected layers) to improve processing resolution or reduce processing computation times. This provides the wireless network with the flexibility to dynamically adapt the E2E DNN as the E2E communication directs processing to or from an edge compute server (ECS), such as when a UE moves into a coverage area that includes an ECS or when the UE moves out of the coverage area. This also allows the wireless network to reconfigure the E2E DNN with architectures optimized for edge computing while the E2E communication incorporates the ECS, and with architectures optimized towards cloud-based computing while the E2E communication omits the ECS to improve processing resolutions, processing computation times, latency, and so forth, based on the participation mode of the ECS.

This document describes aspects of E2E DNN adaptation for edge computing, which allows the system to process communications and dynamically reconfigure DNNs used in E2E communications as endpoints of the E2E communication change. Aspects describe forming and/or adapting an end-to-end, E2E, machine-learning, ML, configuration that forms an E2E deep neural network (DNN) for processing communications transferred through an E2E communication. A network entity directs a user equipment (UE) and a base station participating in the E2E communication to implement the E2E communication by forming at least a portion of the E2E DNN based on a first E2E ML configuration. The network entity determines to update the first E2E ML configuration based on a change in a participation mode of an ECS in the E2E communication. The network entity identifies a second E2E ML configuration based on the change in participation mode and directs the UE or the base station to update the portion of the E2E DNN using the second E2E ML configuration.

In aspects, a UE adapts an E2E ML configuration for processing communications transferred through an E2E communication. The UE forms a deep neural network (DNN) using at least a first portion of a first E2E ML configuration for an E2E DNN that implements an E2E communication. The UE receives an indication to update the DNN using at least a second portion of a second E2E ML configuration based on a change in a participation mode of an ECS in the E2E communication. The UE then updates the DNN using the at least a second portion of the E2E ML configuration based on the participation mode of the ECS and implements at least a portion of the E2E communication using the updated DNN.

Example Environment

FIG. 1 illustrates an example environment 100 that includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station(s), and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or a combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (COMP) communication with the UE 110.

The base stations 120 collectively form a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an SI interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane data and control-plane information. The user equipment 110 may connect, via the core network 150, to public networks, such as the Internet 160, to interact with a remote service 170. The remote service 170 represents the computing, communication, and storage devices used to provide any of a multitude of services, including interactive voice or video communication, file transfer, streaming voice or video, and other technical services implemented in any manner such as voice calls, video calls, website access, messaging services (e.g., text messaging or multi-media messaging), photo file transfer, enterprise software applications, social media applications, videogaming, streaming video or audio services, and podcasts.

The RAN 140 also includes one or more edge compute servers 180 (ECS 180), illustrated here as edge compute server 181, and edge compute server 182 (ECS 181, ECS 182) that provide edge computing resources for processing application data for the UE 110. ECS 181 connects to the base station 121 using an Xe interface, shown at interface 191, and the core network 150 through a core network interface 192. Similarly, ECS 182 connects to the base station 122 using an Xe interface, shown at interface 193, and the core network 150 through a core network interface 194. In aspects, the core network 150 manages and/or grants access to resources of the ECS 181 and/or ECS 182. Alternatively, or additionally, the core network 150 manages mobility of applications and associated data and context of the applications between the ECS 181, the ECS 182, and/or the remote service 170. As one example, when the UE 110 is handed over from a serving cell base station (e.g., base station 121) to a neighbor base station (e.g., base station 122), the core network 150 server transfers the application and any data and context associated with the application of the ECS 181 to the ECS 182. Thus, in aspects, the core network 150 includes ECS management functionality.

Example Devices

Figure 2:
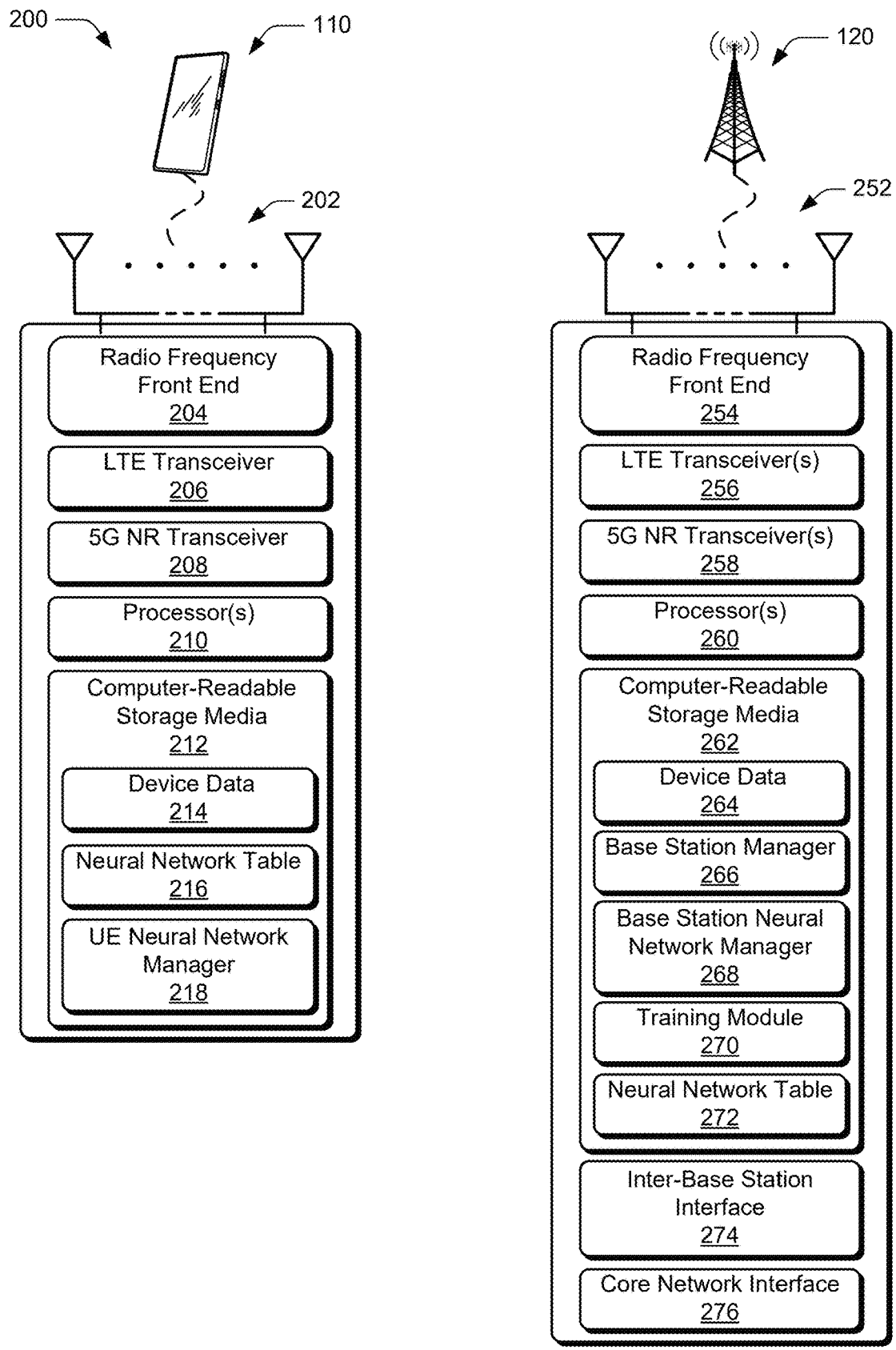
FIG. 2 illustrates an example device diagram of devices that can implement various aspects of E2E DNN adaptation for edge computing.
Figure 3:
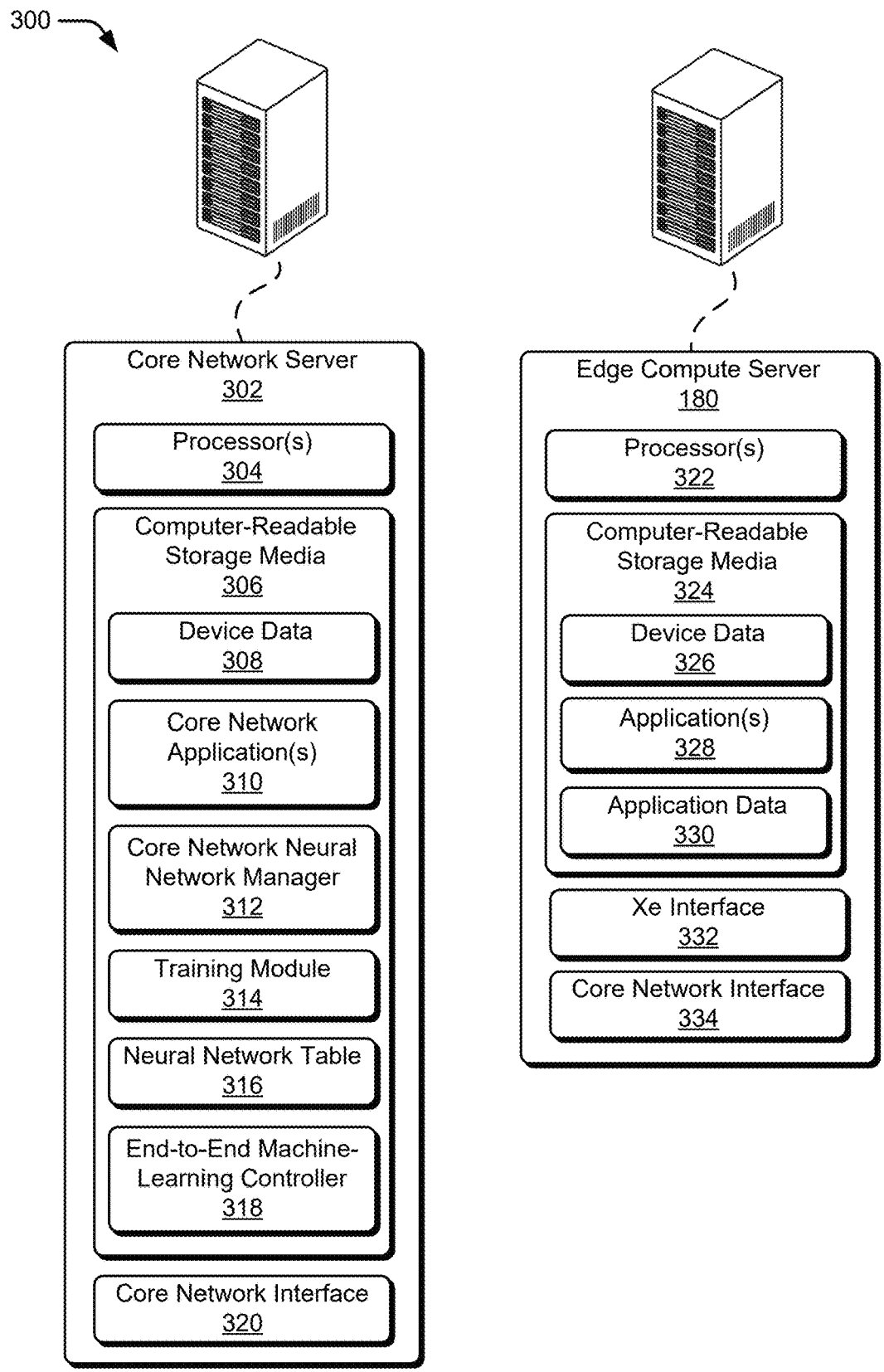
FIG. 3 illustrates an example device diagram of other devices that can implement various aspects of E2E DNN adaptation for edge computing.

FIG. 2 illustrates an example device diagram 200 of the UE 110 and one of the base stations 120 that can implement various aspects of E2E DNN adaptation for edge computing. FIG. 3 illustrates an example device diagram 300 of a core network server 302 and an ECS 180 (e.g., ECS 181, ECS 182) that can implement various aspects of E2E DNN adaptation for edge computing. The UE 110, the base station 120, the core network server 302, and/or the ECS 180 may include additional functions and interfaces that are omitted from FIG. 2 or FIG. 3 for the sake of clarity.

The UE 110 includes antennas 202, a radio frequency front end 204 (RF front end 204), a wireless transceiver (e.g., an LTE transceiver 206, and/or a 5G NR transceiver 208) for communicating with the base station 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHz bands, and/or above-6 GHz bands that are defined by the 3GPP LTE and 5G NR communication standards.

The UE 110 also includes processor(s) 210 and computer-readable storage media 212 (CRM 212). The processor 210 may be a single-core processor or a multiple-core processor composed of a variety of materials, such as silicon, poly-silicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, neural network (NN) tables, and/or an operating system of the UE 110, which are executable by processor(s) 210 to enable user-plane communication, control-plane signaling, and user interaction with the user equipment 110.

In aspects, the CRM 212 includes a neural network table 216 that stores various architecture and/or parameter configurations that form a neural network, such as, by way of example and not of limitation, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of neural network formation configuration elements (NN formation configuration elements), such as architecture and/or parameter configurations, that can be used to create a neural network formation configuration (NN formation configuration) that includes a combination of one or more NN formation configuration elements that define and/or form a DNN. In some aspects, a single index value of the neural network table 216 maps to a single NN formation configuration element (e.g., a 1:1 correspondence). Alternatively, or additionally, a single index value of the neural network table 216 maps to an NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

The CRM 212 may also include a user equipment neural network manager 218 (UE neural network manager 218). Alternatively, or additionally, the UE neural network manager 218 may be implemented in whole or part as hardware logic or circuitry integrated with or separate from other components of the user equipment 110. The UE neural network manager 218 accesses the neural network table 216, such as by way of an index value, and forms a DNN using the NN formation configuration elements specified by an NN formation configuration. This includes updating the DNN with any combination of architectural changes and/or parameter changes to the DNN as further described, such as a small change to the DNN that involves updating parameters and/or a large change that reconfigures node and/or layer connections of the DNN. In implementations, the UE neural network manager forms multiple DNNs to process wireless communications (e.g., downlink communications, uplink communications).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio frequency front end 254 (RF front end 254), one or more wireless transceivers (e.g., one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured in a manner similar to, or different from, each other. The antennas 252 and the RF front end 254 can be tuned to, and/or be tunable to, one or more frequency bands defined by the 3GPP LTE and 5G NR communication standards and implemented by the LTE transceivers 256 and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also includes processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the UE 110.

CRM 262 also includes a base station manager 266. Alternatively, or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the UE 110, as well as communication with a core network, such as the core network 150.

CRM 262 also includes a base station neural network manager 268 (BS neural network manager 268). Alternatively, or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements to form a DNN for processing edge computing communications and/or cloud-based communications. In some implementations, the BS neural network manager 268 receives feedback from the UE 110 and selects the NN formation configuration based on the feedback. Alternatively, or additionally, the BS neural network manager 268 receives neural network formation configuration directions from core network 150 elements through a core network interface 276 or an inter-base station interface 274 and forwards the NN formation configuration directions to UE 110. In some aspects, the BS neural network manager 268 selects the NN formation configuration in response to determining to add edge computing to, or remove edge computing from, an E2E communication.

The CRM 262 includes a training module 270 and a neural network table 272. In implementations, the base station 120 manages and deploys NN formation configurations to UE 110. Alternatively, or additionally, the base station 120 maintains the neural network table 272. The training module 270 teaches and/or trains DNNs using known input data. For instance, the training module 270 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications, processing edge computing communications, processing cloud-based computing communications, aggregating edge computing communications with cloud-based computing communications). This includes training the DNN(s) offline (e.g., while the DNN is not actively engaged in processing the communications) and/or online (e.g., while the DNN is actively engaged in processing the communications).

In implementations, the training module 270 extracts learned parameter configurations from the DNN to identify the NN formation configuration elements and/or NN formation configuration, then adds and/or updates the NN formation configuration elements and/or NN formation configuration in the neural network table 272. The extracted parameter configurations include any combination of information that defines the behavior of a neural network, such as node connections, coefficients, active layers, weights, biases, pooling, etc.

The neural network table 272 stores multiple different NN formation configuration elements and/or NN formation configurations generated using the training module 270. In some implementations, the neural network table includes input characteristics for each NN formation configuration element and/or NN formation configuration, where the input characteristics describe properties about the training data used to generate the NN formation configuration element and/or NN formation configuration. For instance, the input characteristics include, by way of example and not of limitation, an edge computing participation mode, an endpoint participation mode, a cloud-based computing participation mode (e.g., added, omitted, aggregated), power information, signal-to-interference-plus-noise ratio (SINR) information, channel quality indicator (CQI) information, channel state information (CSI), Doppler feedback, frequency bands, BLock Error Rate (BLER), Quality of Service (QoS), Hybrid Automatic Repeat reQuest (HARQ) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, BS capabilities, power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 272 maps to a single NN formation configuration element (e.g., a 1:1 correspondence). Alternatively, or additionally, a single index value of the neural network table 272 maps to an NN formation configuration (e.g., a combination of NN formation configuration elements).

In implementations, the base station 120 synchronizes the neural network table 272 with the neural network table 216 such that the NN formation configuration elements and/or input characteristics stored in one neural network table are replicated in the second neural network table. Alternatively, or additionally, the base station 120 synchronizes the neural network table 272 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

The base station 120 also includes an inter-base station interface 274, such as an Xn and/or X2 interface, which the base station manager 266 configures to exchange user-plane data, control-plane information, and/or other data/information between other base stations, to manage the communication of the base station 120 with the UE 110. The base station 120 includes a core network interface 276 that the base station manager 266 configures to exchange user-plane data, control-plane information, and/or other data/information with core network functions and/or entities.

In FIG. 3, the core network server 302 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 302 may provide all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and so forth. The core network server 302 is illustrated as being embodied on a single server that includes processor(s) 304 and computer-readable storage media 306 (CRM 306). The processor 304 may be a single-core processor or a multiple-core processor composed of a variety of materials, such as silicon, polysilicon, high-K dielectric, copper, and so on. CRM 306 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 308 of the core network server 302. The device data 308 includes data to support a core network function or entity and/or an operating system of the core network server 302, which are executable by processor(s) 304.

CRM 306 also includes one or more core network applications 310, which, in one implementation, is embodied on CRM 306 (as shown). The one or more core network applications 310 may implement the functionality such as UPF, AMF, S-GW, P-GW, MME, ePDG, ECS management, and so forth. Alternatively, or additionally, the one or more core network applications 310 may be implemented in whole or part as hardware logic or circuitry integrated with or separate from other components of the core network server 302.

CRM 306 also includes a core network neural network manager 312 that manages NN formation configurations used to form DNNs for processing communications transferred between the UE 110 and the base station 120, such as E2E communications that add or omit an ECS for application processing. In aspects, the core network neural network manager 312 analyzes various E2E communication endpoint connection configurations (e.g., the inclusion/exclusion of the ECS 180, the inclusion/exclusion of the remote service 170, the aggregation of ECS 180 communications with remote service 170 communications), and selects an end-to-end machine-learning configuration (E2E ML configuration) that can be used to form an end-to-end deep neural network (E2E DNN) that processes communications in an E2E communication based on the added and/or omitted endpoints. In aspects, the core network neural network manager 312 selects one or more NN formation configurations within the neural network table 316 to indicate the determined E2E ML configuration.

In some implementations, the core network neural network manager 312 analyzes various criteria, such as current signal channel conditions (e.g., as reported by base station 120, as reported by other wireless access points, as reported by UEs 110 (via base stations or other wireless access points)), capabilities of the base station 120 (e.g., antenna configurations, cell configurations, MIMO capabilities, radio capabilities, processing capabilities), capabilities of the UE 110 (e.g., antenna configurations, MIMO capabilities, radio capabilities, processing capabilities), and so forth. For example, the base station 120 obtains the various criteria and/or link quality indications during the communications with the UE and forwards the criteria and/or link quality indications to the core network neural network manager 312. The core network neural network manager selects, based on these criteria and/or indications, an E2E ML configuration that improves the accuracy (e.g., lower bit errors, higher signal quality) of a DNN processing the communications. The core network neural network manager 312 then communicates the E2E ML configuration to the base stations 120 and/or the UE 110, such as by communicating indices of the neural network table. In implementations, the core network neural network manager 312 receives UE and/or BS feedback from the base station 120 and selects an updated E2E ML configuration based on the feedback.

The CRM 306 includes a training module 314 and a neural network table 316. In implementations, the core network server 302 manages and deploys E2E ML configurations and/or portions of a partitionable E2E ML configuration to multiple devices (e.g., UE 110, base station 120) in a wireless communication system. Alternatively, or additionally, the core network server maintains the neural network table 316 outside of the CRM 306. The training module 314 teaches and/or trains DNNs using known input data. For instance, the training module 314 trains DNN(s) to process different types of pilot communications transmitted over a wireless communication system. This includes training the DNN(s) offline and/or online. In implementations, the training module 314 extracts a learned NN formation configuration and/or learned NN formation configuration elements from the DNN and stores the learned NN formation configuration elements in the neural network table 316, such as an NN formation configuration that can be selected by the core network neural network manager 312 as an E2E ML configuration to form an E2E DNN as further described. Thus, an NN formation configuration includes any combination of architecture configurations (e.g., node connections, layer connections) and/or parameter configurations (e.g., weights, biases, pooling) that define or influence the behavior of a DNN. In some implementations, a single index value of the neural network table 316 maps to a single NN formation configuration element (e.g., a 1:1 correspondence). Alternatively, or additionally, a single index value of the neural network table 316 maps to an NN formation configuration (e.g., a combination of NN formation configuration elements).

In some implementations, the training module 314 of the core network neural network manager 312 generates complementary NN formation configurations and/or NN formation configuration elements to those stored in the neural network table 216 at the UE 110 and/or the neural network table 272 at the base station 120. As one example, the training module 314 generates the neural network table 316 with NN formation configurations and/or NN formation configuration elements that have a high variation in the architecture and/or parameter configurations relative to medium and/or low variations used to generate the neural network table 272 and/or the neural network table 216. For instance, the NN formation configurations and/or NN formation configuration elements generated by the training module 314 correspond to fully connected layers, a full kernel size, frequent sampling and/or pooling, high weighting accuracy, and so forth. Accordingly, the neural network table 316 includes, at times, high-accuracy neural networks with the trade-off of increased processing complexity and/or time.

The neural network table 316 stores multiple different NN formation configuration elements generated using the training module 314. In some implementations, the neural network table includes input characteristics for each NN formation configuration element and/or NN formation configuration, where the input characteristics describe properties about the training data used to generate the NN formation configuration. For instance, the input characteristics can include an edge computing participation mode (e.g., added, omitted, aggregated), a cloud-based computing participation mode (e.g., added, omitted, aggregated), power information, SINR information, CQI, CSI, Doppler feedback, RSS, error metrics, minimum end-to-end (E2E) latency, desired E2E latency, E2E QoS, E2E throughput, E2E packet loss ratio, cost of service, etc.

The CRM 306 also includes an end-to-end machine-learning controller 318 (E2E ML controller 318). The E2E ML controller 318 determines an end-to-end machine-learning configuration (E2E ML configuration) for processing information transferred through an E2E communication, such as determining an E2E ML configuration based on one or more endpoint participation modes as further described. Alternatively, or additionally, the E2E ML controller analyzes any combination of ML capabilities (e.g., supported ML architectures, supported number of layers, available processing power, memory limitations, available power budget, fixed-point processing vs. floating-point processing, maximum kernel size capability, computation capability) of devices participating in the E2E communication. In some implementations, the E2E ML controller obtains metrics that characterize a current operating environment and analyzes the current operating environment to determine the E2E ML configuration. This includes determining an E2E ML configuration that includes an architecture configuration in combination with parameter configuration(s) that define a DNN or determining an E2E ML configuration that simply includes parameter configurations used to update the DNN.

In determining the E2E ML configuration, the E2E ML controller sometimes determines partitions to the E2E ML configuration that distribute the processing functionality associated with the E2E ML configuration across multiple devices. For clarity, FIG. 3 illustrates the E2E ML controller 318 as separate from the core network neural network manager 312, but in alternative or additional implementations, the core network neural network manager 312 includes functionality performed by the E2E ML controller 318 or vice versa. Further, while FIG. 3 illustrates the core network server 302 implementing the E2E ML controller 318, alternative or additional devices can implement the E2E ML controller, such as the base station 120 and/or other network elements.

The core network server 302 also includes a core network interface 320 for communication of user-plane data, control-plane information, and other data/information with the other functions or entities in the core network 150, base stations 120, ECS 180, or UE 110. In implementations, the core network server 302 communicates E2E ML configuration, or portions of a partitionable E2E ML configuration, to the base station 120 using the core network interface 320. The core network server 302 alternatively or additionally receives feedback from the base stations 120 and/or the UE 110, by way of the base stations 120, using the core network interface 320.

The ECS 180 includes processor(s) 322 and computer-readable storage media 324 (CRM 324). The processor 322 may be a single-core processor or a multiple-core processor composed of a variety of materials, such as silicon, polysilicon, high-K dielectric, copper, and so on. CRM 324 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 326 of the ECS 180. The CRM 324 includes applications 328 and application data 330 used by the UE 110 and/or an operating system of the ECS 180, which are executable by processor(s) 322 to enable communication with the UE 110, the base station 120, and the core network server 302.

The ECS 180 also includes an Xe interface 332 for communication with the base station 120 and the core network interface 334 for communication of user-plane data and/or control-plane information with the core network server 302.

Configurable Machine-Learning Modules

Figure 4:
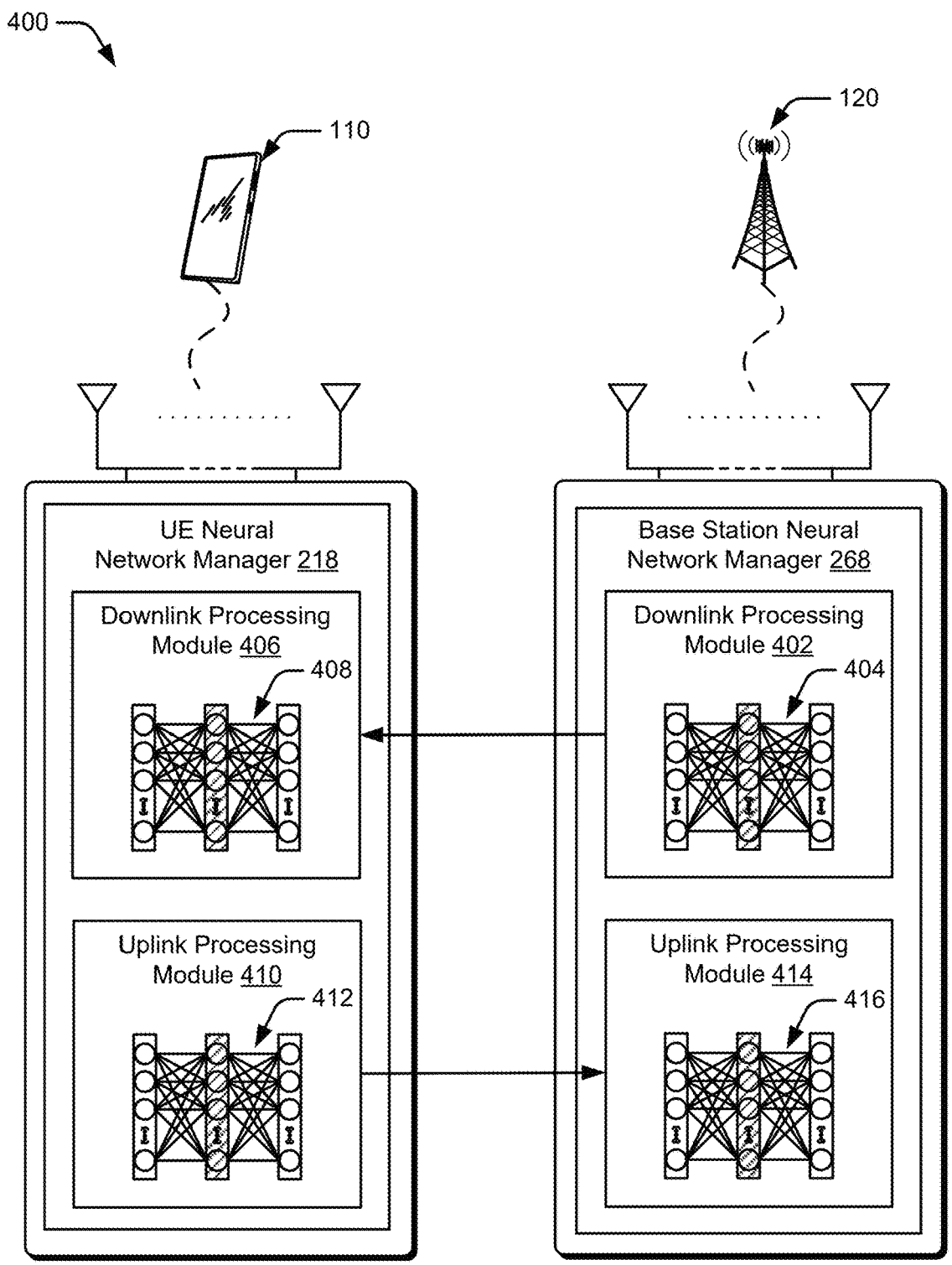
FIG. 4 illustrates an example operating environment in which multiple deep neural networks are utilized in a wireless communication system in accordance with aspects of E2E DNN adaptation for edge computing.

FIG. 4 illustrates an example operating environment 400 that includes UE 110 and base station 120 that can implement various aspects of E2E DNN adaptation for edge computing. In implementations, the UE 110 and base station 120 exchange communications with one another over a wireless communication system by processing the communications using multiple DNNs.

The base station neural network manager 268 of the base station 120 includes a downlink processing module 402 for processing downlink communications, such as for generating downlink communications transmitted to the UE 110. To illustrate, the base station neural network manager 268 forms deep neural network(s) 404 (DNNs 404) in the downlink processing module 402 using an E2E ML configuration and/or a portion of an E2E ML configuration as further described. In aspects, the DNNs 404 perform some or all of a transmitter processing chain functionality used to generate downlink communications, such as a processing chain that receives input data, progresses to an encoding stage, followed by a modulating stage, and then a radio frequency (RF) analog transmit (Tx) stage. To illustrate, the DNNs 404 can perform convolutional encoding, serial-to-parallel conversion, cyclic prefix insertion, channel coding, time/frequency interleaving, and so forth. In some aspects, the DNN 404 processes edge computing communications, cloud-based computing communications, or any combination thereof.

Similarly, the UE neural network manager 218 of the UE 110 includes a downlink processing module 406, where the downlink processing module 406 includes deep neural network(s) 408 (DNNs 408) for processing (received) downlink communications. In various implementations, the UE neural network manager 218 forms the DNNs 408 using an E2E ML configuration and/or a portion of an E2E ML configuration as further described. In aspects, the DNNs 408 perform some or all receiver processing functionality for (received) downlink communications, such as complementary processing to the processing performed by the DNNs 404 (e.g., an RF analog receive (Rx) stage, a demodulating stage, a decoding stage). To illustrate, the DNNs 408 can perform any combination of extracting data embedded in the Rx signal, recovering binary data, correcting for data errors based on forward error correction applied at the transmitter block, extracting payload data from frames and/or slots, and so forth.

The base station 120 and/or the UE 110 also process uplink communications using DNNs. In environment 400, the UE neural network manager 218 includes an uplink processing module 410, where the uplink processing module 410 includes deep neural network(s) 412 (DNNs 412) for generating and/or processing uplink communications (e.g., encoding, modulating). In other words, uplink processing module 410 processes pre-transmission communications as part of processing the uplink communications. The UE neural network manager 218, for example, forms the DNNs 412 using an E2E ML configuration and/or a portion of an E2E ML configuration to perform some or all of the transmitter processing functionality used to generate uplink communications transmitted from the UE 110 to the base station 120. In aspects, the DNNs 412 perform some or all of a transmitter processing chain functionality used to generate uplink communications, such as a processing chain that receives input data, progresses to an encoding stage, followed by a modulating stage, and then a radio frequency (RF) analog transmit (Tx) stage.

Similarly, uplink processing module 414 of the base station 120 includes deep neural network(s) 416 (DNNs 416) for processing (received) uplink communications, where the base station neural network manager 268 forms DNNs 416 using an E2E ML configuration and/or a portion of an E2E ML configuration to perform some or all receiver processing functionality for (received) uplink communications, such as uplink communications received from the UE 110. At times, the DNNs 412 and the DNNs 416 perform complementary functionality of one another. For example, the DNNs 416 may perform some or all receiver processing chain functionality for (received) uplink communications, such as complementary processing to the processing performed by the DNNs 412 (e.g., an RF analog receive (Rx) stage, a demodulating stage, a decoding stage).

Generally, a deep neural network (DNN) corresponds to groups of connected nodes that are organized into four or more layers. The nodes between layers are configurable in a variety of ways, such as a partially connected configuration where a first subset of nodes in a first layer are connected with a second subset of nodes in a second layer, or a fully connected configuration where each node in a first layer is connected to each node in a second layer, etc. The nodes can use a variety of algorithms and/or analysis to generate output information based upon adaptive learning, such as single linear regression, multiple linear regression, logistic regression, step-wise regression, binary classification, multiclass classification, multi-variate adaptive regression splines, locally estimated scatterplot smoothing, and so forth. At times, the algorithm(s) include weights and/or coefficients that change based on adaptive learning. Thus, the weights and/or coefficients reflect information learned by the neural network.

A neural network can also employ a variety of architectures that determine what nodes within the neural network are connected, how data is advanced and/or retained in the neural network, what weights and coefficients are used to process the input data, how the data is processed, and so forth. These various factors collectively describe an NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s) (e.g., specifying pooling layers to reduce the dimensions of input data), kernel parameter(s) (e.g., a filter size and/or kernel type to use in processing input data), weights (e.g., biases used to classify input data), and/or layer parameter(s) (e.g., layer connections and/or layer types). While described in the context of pooling parameters, kernel parameters, weight parameters, and layer parameters, other parameter configurations can be used to form a DNN. Accordingly, an NN formation configuration can include any other type of parameter that can be applied to a DNN that influences how the DNN processes input data to generate output data. An E2E ML configuration uses one or more NN formation configurations to form E2E DNNs that process communications from one endpoint to another endpoint. For example, a partitionable E2E ML configuration may use a respective NN formation configuration for each partition.

Figure 5:
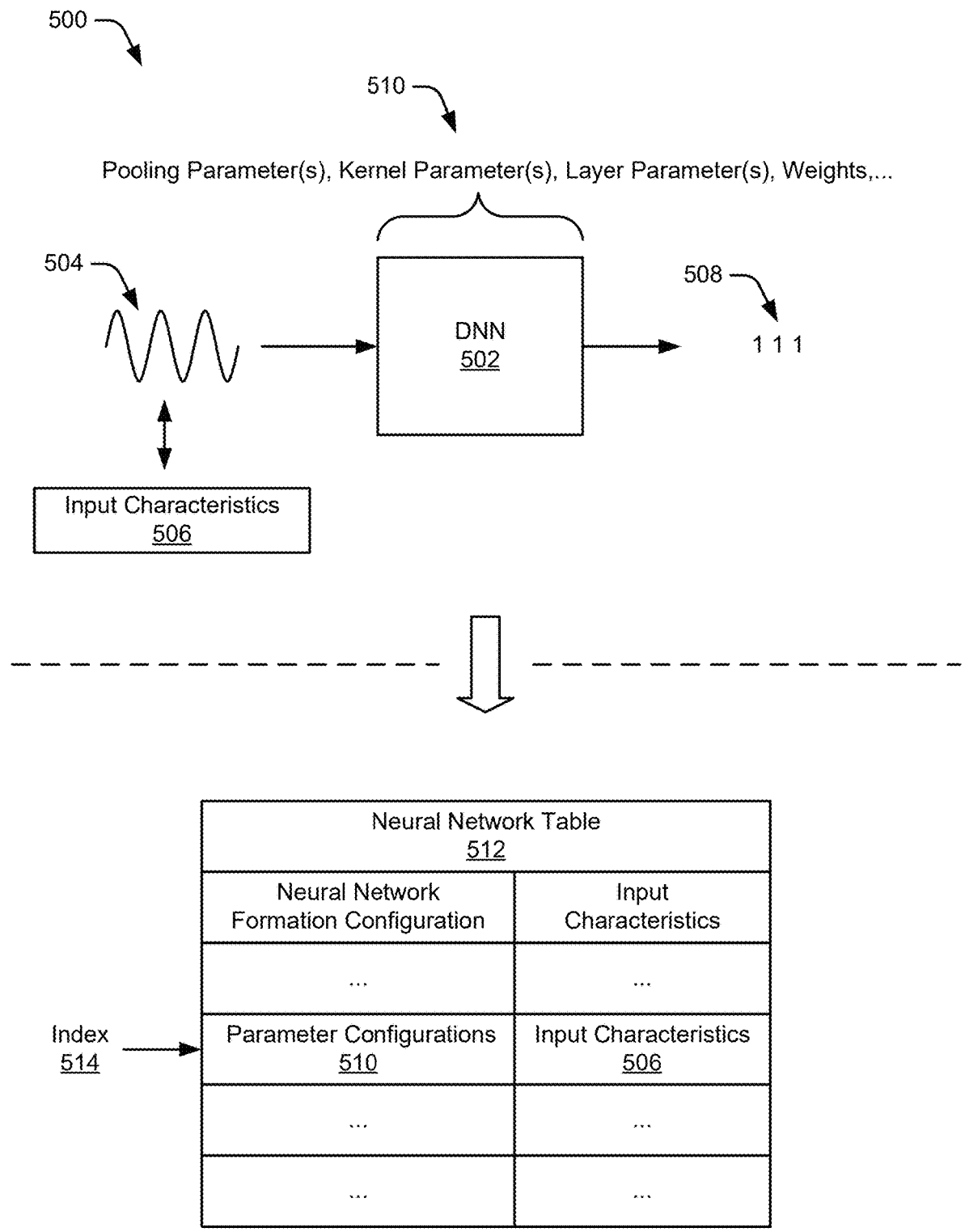
FIG. 5 illustrates an example of generating multiple neural network formation configurations in accordance with aspects of E2E DNN adaptation for edge computing.

FIG. 5 illustrates an example 500 that describes aspects of generating multiple NN formation configurations in accordance with E2E DNN adaptation for edge computing. At times, various aspects of the example 500 are implemented by any combination of the training module 270, the base station neural network manager 268, the core network neural network manager 312, and/or the training module 314 of FIG. 2 and FIG. 3.

The upper portion of FIG. 5 includes a DNN 502 that represents any suitable DNN used to implement E2E DNN adaptation for edge computing. In implementations, a neural network manager determines to generate different NN formation configurations, such as NN formation configurations for different operating configurations based on endpoint participation modes (e.g., a first configuration that adds an ECS to an E2E communication, a second configuration that omits the ECS from the E2E communication, a third configuration that aggregates edge computing communications with cloud-based computing communications, a fourth configuration that excludes a remote service from the E2E communication). Alternatively, or additionally, the neural network generates NN formation configurations based on different transmission environments and/or transmission channel conditions. Training data 504 represents an example input to the DNN 502, such as data corresponding to a downlink communication and/or uplink communication with a particular operating configuration and/or a particular transmission environment. To illustrate, the training data 504 can include digital samples of a downlink wireless signal, recovered symbols, recovered frame data, binary data, etc. In some implementations, the training module generates the training data mathematically or accesses a file that stores the training data. Other times, the training module obtains real-world communications data. Thus, the training module can train the DNN 502 using mathematically generated data, static data, and/or real-world data. Some implementations generate input characteristics 506 that describe various qualities of the training data, such as an operating configuration, transmission channel metrics, UE capabilities, UE velocity, the inclusion of edge computing, and so forth.

The DNN 502 analyzes the training data and generates an output 508 represented here as binary data. Some implementations iteratively train the DNN 502 using the same set of training data and/or additional training data that has the same input characteristics to improve the accuracy of the machine-learning module. During training, the machine-learning module modifies some or all of the architecture and/or parameter configurations of a neural network included in the machine-learning module, such as node connections, coefficients, kernel sizes, etc. At some point in the training, the training module determines to extract the architecture and/or parameter configurations 510 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module to use as an NN formation configuration and/or NN formation configuration element(s). The architecture and/or parameter configurations can include any combination of fixed architecture and/or parameter configurations, and/or variable architectures and/or parameter configurations.

The lower portion of FIG. 5 includes a neural network table 512 that represents a collection of NN formation configuration elements, such as neural network table 216, neural network table 272, and/or neural network table 316 of FIG. 2 and FIG. 3. The neural network table 512 stores various combinations of architecture configurations, parameter configurations, and input characteristics, but alternative implementations omit the input characteristics from the table. Various implementations update and/or maintain the NN formation configuration elements and/or the input characteristics as the DNN learns additional information. For example, at index 514, the neural network manager and/or the training module updates neural network table 512 to include architecture and/or parameter configurations 510 generated by the DNN 502 while analyzing the training data 504. At a later point in time, such as when determining an E2E ML configuration for processing communications in an E2E communication that adds or omits an ECS endpoint, the neural network manager selects one or more NN formation configurations from the neural network table 512 by matching the input characteristics to a current operating environment and/or configuration, such as by matching the input characteristics to current channel conditions, the participation mode of edge computing, UE capabilities, UE characteristics (e.g., velocity, location, etc.) and so forth.

E2E Architecture Adaptation for Edge Computing

Aspects of an end-to-end communication (E2E communication) involve two or more endpoints transferring communications between one another, such as a data session between a UE, a remote service, and/or an ECS. The E2E communication can correspond to single-direction transfers, where a first endpoint sends a communication and a second endpoint receives and/or recovers the communication (e.g., downlink only, uplink only), or bi-directional transfers, where both endpoints send and receive the communications (e.g., reciprocity of downlink and uplink) with one another.

Different factors impact the configuration and operational efficiency of the E2E communication and how the network devices process and/or route communications through the E2E communication. As one example, an ECS endpoint processes UE application data and transfers the application data through the E2E communication with less latency relative to a cloud-based computing endpoint (e.g., remote service 170) based on closer proximity to the UE. As another example, a current operating environment (e.g., current channel conditions, UE location, UE movement, UE capabilities) impacts how accurately (e.g., bit error rate, packet loss) a receiving endpoint recovers data. To illustrate, an E2E communication implemented using 5G millimeter wave (mmW) technologies becomes susceptible to more signal distortions relative to lower frequency sub-6 GHz signals. As yet another example, devices participating in the E2E communication oftentimes have capabilities and resources that differ from one another (e.g., memory storage, processor power). Adapting E2E DNNs provides a flexible solution to dynamic and changing factors that impact a performance (e.g., higher processing resolution, faster processing, lower bit errors, improved signal quality, improved latency) of data transfer and/or recovery through an E2E communication.

In aspects of E2E DNN adaptation for edge computing, a UE, a base station, and/or a core network server dynamically adapt and/or switch the E2E ML configuration (e.g., architecture, parameters) of an E2E DNN based on the endpoint(s) participating in the E2E communication. For example, various aspects adapt the E2E ML configuration as the endpoints of a data session E2E communication switch between an ECS and a remote service. To illustrate, a first E2E ML configuration directed to an E2E communication that incorporates an ECS may prioritize processing quality over computation latencies. In other words, because the ECS communications have lower transfer latencies relative to other endpoints, the E2E ML configuration forms an E2E DNN that includes more processing layers and/or processes data with a higher resolution to improve a quality of the E2E communication. Alternatively, a second E2E ML configuration directed to an E2E communication incorporating a remote server prioritizes computation latencies over processing quality based on the remote service having higher transfer latencies relative to other endpoints. Thus, the second E2E ML configuration directed to processing communications with a remote service forms an E2E DNN with fewer processing layers, more data down-sampling, reduced number of fully connected layers, and/or less processing resolution relative to the first E2E ML configuration. Various aspects adapt and/or reconfigure the E2E ML configuration to form an E2E DNN that aggregates and/or splits the communications through the E2E communication between multiple endpoints.

Figure 6:
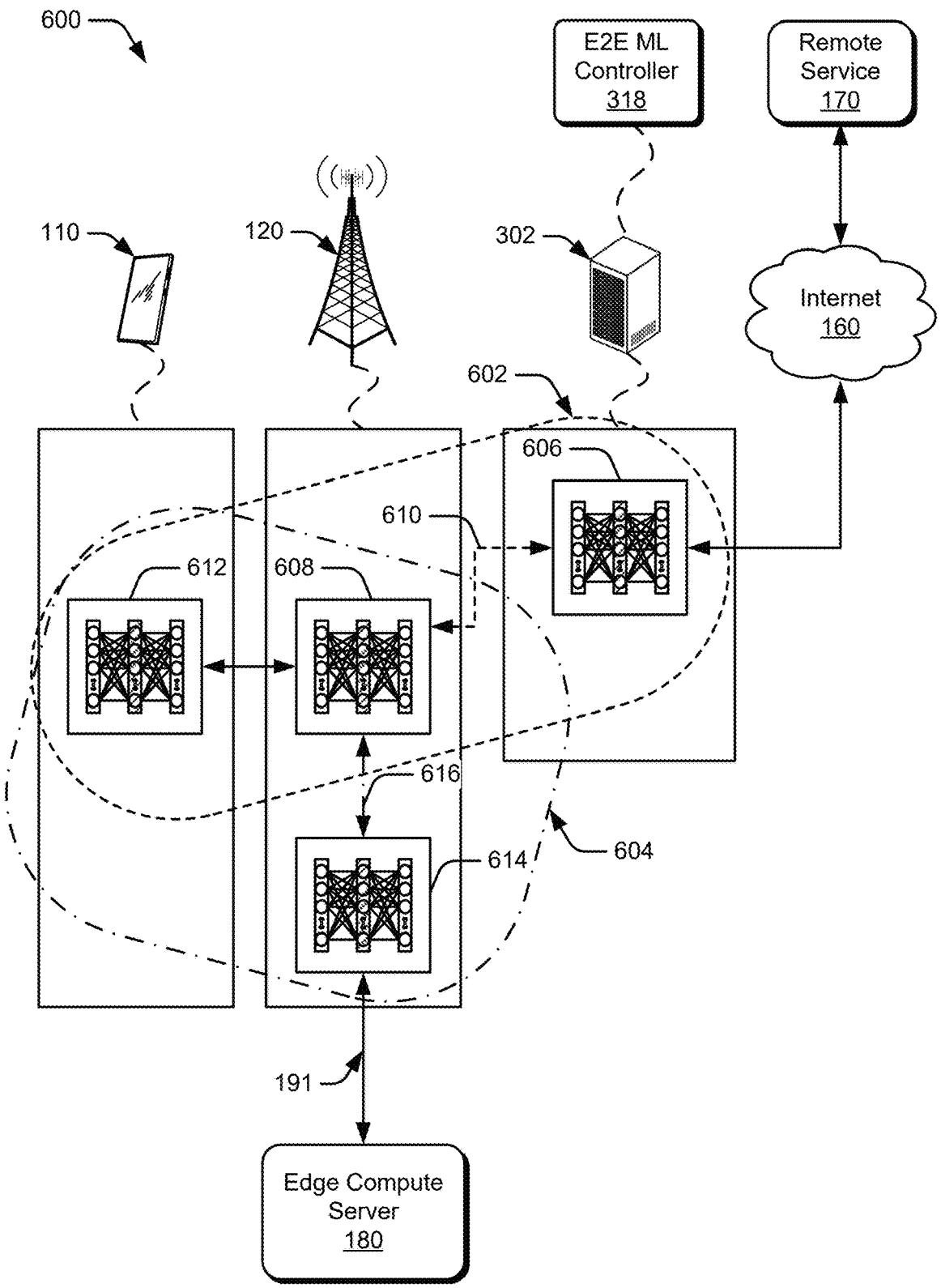
FIG. 6 illustrates an example operating environment in which E2E DNN adaptation for edge computing can be implemented in accordance with various aspects.

FIG. 6 illustrates an example environment 600 in which E2E DNN adaptation for edge computing can be implemented in accordance with various aspects. The environment 600 includes the UE 110, the base station 120, the remote service 170, the ECS 180 of FIG. 1, and the core network server 302 of FIG. 3. In aspects, the UE 110, the base station 120, and/or the core network server 302 implement example partitions of an E2E DNN for processing information and/or data transfer through an E2E communication.

As described with reference to FIG. 3, the E2E ML controller 318 determines one or more E2E ML configurations that form E2E DNN(s) for processing communications transferred through one or more E2E communications. This includes determining adjustments to: (a) existing E2E ML configurations, such as small adjustments using parameter updates (e.g., coefficients, weights) to tune the E2E DNN(s) based on feedback and/or (b) ML architecture changes (e.g., number of layers, layer computation modes (e.g., down-sampling configurations, adding or removing fully convolutional layers), node connections) to reconfigure the E2E DNN(s). In the environment 600, the E2E ML controller 318 determines an E2E ML configuration that forms a bi-directional E2E DNN, but in alternative or additional implementations, the E2E ML controller 318 determines E2E ML configurations to form single-direction E2E DNN(s).

As shown in FIG. 6, the E2E ML controller 318 determines a first E2E ML configuration for forming a first E2E DNN that processes communications transferred through a first E2E communication 602 between the UE 110 and the remote service 170, and a second E2E ML configuration for forming a second E2E DNN that processes communications transferred through a second E2E communication 604 between the UE 110 and the ECS 180. In aspects, the E2E ML controller 318 dynamically determines different E2E ML configurations, and adaptations to those configurations, in response to participation changes of endpoints in an E2E communication (e.g., changing endpoints in a data session), such as when the UE 110 moves in and out of a coverage area of a base station (e.g., the base station 120) connected to an ECS (e.g., the ECS 180).

Because the E2E communication 602 uses a different endpoint than the E2E communication 604, the E2E ML controller 318 determines different architectures and/or parameters for each E2E ML configuration based on different priorities. For example, in response to determining to modify an existing E2E communication by including the remote service 170 as an endpoint, the E2E ML controller 318 determines a first ML architecture based on prioritizing transfer latencies (e.g., minimizing transfer latencies) over processing quality (e.g., processing resolution, data frame rates). For instance, the E2E ML controller 318 selects an architecture with fewer processing layers and/or more data down-sampling to reduce computation times as further described. In response to determining to remove the remote service 170 as an endpoint and to add the ECS 180 as an endpoint, the E2E ML controller 318 identifies a second ML architecture based on prioritizing processing quality (e.g., higher processing resolution, higher frame rate) over processing latencies, such as by selecting an ML architecture with more processing layers (e.g., more convolutional layers, less down-sampling, and so forth, that increases processing accuracy at the cost of increasing computation times. Thus, the E2E ML controller 318 dynamically adapts the E2E ML configuration based on the participation mode changes of an ECS and/or a cloud-based service in the E2E communication.

The E2E ML controller 318 can determine the E2E ML configurations based on other factors as well, such as machine-learning (ML) capabilities (e.g., supported ML architectures, supported number of layers, available processing power, memory limitation, available power budget, fixed-point processing vs. floating-point processing, maximum kernel size capability, computation capability) of the device(s) or network entities participating in the E2E communication. As another example, the E2E ML controller analyzes a current operating environment, such as by analyzing link quality indications received from the UE 110 and/or the base station 120. In determining the E2E ML configuration, some implementations of the E2E ML controller partition the E2E ML configuration based on the device(s) participating in the E2E communication and communicate a respective partition of the E2E ML configuration to each respective device. As one example, the core network server 302 sends a message to the UE 110, such as a non-stratum access (NAS) message, to indicate an architecture and/or parameter change to a UE-implemented DNN that processes data routed through the E2E communication.

The E2E ML controller 318 determines a first E2E ML configuration for forming a first E2E DNN that processes communications transferred through the E2E communication 602. The E2E ML controller 318 identifies the first E2E ML configuration using any combination of information, such as a participation mode of the endpoints (e.g., add the remote service 170, omit the ECS 180), end-point characteristics (e.g., latencies, throughput), prioritizations, link quality indications, performance requirements (e.g., resource type, priority level, packet delay budget, packet error rate, maximum data burst volume, averaging window, security level), available wireless network resources, ML capabilities of participating devices (e.g., the base station

120, the core network server 302, the UE 110), a current operating environment (e.g., channel conditions, UE location), and so forth.

In aspects, the E2E ML controller 318 identifies characteristics about the remote service 170 by analyzing historical records and/or metrics. To illustrate, the E2E controller 318 accesses historical records that indicate a statistical round-trip transfer latency characteristic of data transfer between the core network server 302 and the remote service 170. If the transfer latency characteristic exceeds a performance threshold or consumes a majority of a time budget for data transfers, the E2E ML controller 318 selects an E2E ML configuration with an architecture directed to processing data transfers through the E2E communication within a predetermined (shorter) timeframe relative to other architectures to offset or compensate for the transfer latency characteristic of the remote service and/or to maintain the time budget. To illustrate, consider an end-to-end round-trip latency time budget of 100 milliseconds (msec.). In response to determining that the round-trip transfer latency characteristic of communications between the core network server 302 and the remote service 170 statistically exceeds 50 msec. (thus, taking a majority of the round-trip latency time budget), the E2E ML controller 318 identifies a first E2E ML configuration with a first architecture that processes data transfers through the E2E communication within 10 msec. with less resolution relative to a second architecture that processes data transfers through the E2E communication within 20 msec. at a higher resolution. For instance, the E2E ML controller 318 selects a first E2E ML configuration with fewer layers, changing a layer computation mode to increase or decrease down-sampling performed by the layer, less fully connected layers, and/or fewer processing nodes relative to the second E2E ML configuration.

The E2E ML controller 318 sometimes determines partitions to the E2E ML configuration (and resulting E2E DNN formed with the E2E ML configuration) to distribute processing amongst the various devices participating in the E2E communication. In other words, the E2E ML configuration forms a distributed E2E DNN, where multiple devices implement respective portions of the distributed E2E DNN. For instance, in response to determining the first E2E ML configuration associated with the E2E communication 602, the E2E ML controller 318 partitions the first E2E ML configuration into portions and directs the devices to form respective DNNs based on the portions. To illustrate, the core network server 302 forms a first (central) DNN 606 using a first portion of the first E2E ML configuration to process communication transfers through the E2E communication 602 at the core network server with the remote service 170 (and/or other cloud-based services) through the Internet 160. In some aspects, the E2E ML controller 318 alternatively, or additionally, partitions the first E2E ML configuration to form a DNN (e.g., a portion of the E2E DNN) at a data center (not illustrated). In aspects, the E2E ML controller 318 partitions the E2E DNN to offload computationally intensive operations at the base station 120 to the core network server (e.g., by way of DNN 606). Alternatively or additionally, the DNN 606 routes communications to and from the remote service by way of the internet, such as by generating network packets to send to the remote service 170 through the Internet and/or by receiving network packets from the remote service 170 in a manner optimized for E2E communications.

Similarly, the base station 120 forms a second DNN 608 using a second portion of the first E2E ML configuration for processing communications transferred through the E2E communication 602, where the DNN 606 and the DNN 608 communicate with one another at interface 610 as part of the E2E communication 602. In other words, the DNN 606 provides input to the DNN 608, and/or the DNN 608 provides input to the DNN 606. The UE 110 forms a third DNN 612 using a third portion and/or partition of the first E2E ML configuration to process communications transferred through the E2E communication 602. Collectively, the DNNs 606, 608, and 612 correspond to a distributed (and partitionable) E2E DNN formed from an E2E ML configuration, where the DNN 606 generally corresponds to a central DNN directed to processing communications with the remote service 170 (through the Internet 160).

In aspects, the core network server 302, the base station 120, and/or the UE 110 determine to modify the E2E communication 602 to add the ECS 180 and omit the remote service 170. In other words, the core network server 302, the base station 120, and/or the UE 110 determine to adapt and/or change the E2E DNN associated with the E2E communication 602 to form an E2E DNN associated with the E2E communication 604. However, as described with reference to FIG. 7, the core network server 302, the base station 120, and/or the UE 110 sometimes modify the E2E ML configuration to form an E2E DNN that processes input/output with multiple endpoints. The core network server 302, the base station 120, and/or the UE 110 can determine to modify an E2E communication based on a variety of factors. As one example, the UE 110 indicates an estimated-UE location to the core network sever, by way of the base station 120, and the core network server 302 determines to switch the UE 110 from a data server to an ECS within a predetermined distance to the estimated-UE location based on transfer latencies. As another example, the UE 110 transmits a request to the base station 120 for the addition of an ECS to increase data throughput and/or improve latency. As yet another example, the base station 120 identifies a particular ECS (from multiple ECSs connected to the base station) closest to the UE based on the estimated-UE location.

In response to determining to include mobile edge computing to the E2E communication, the E2E ML controller 318 determines a second E2E ML configuration, where the second E2E ML configuration can correspond to a separate and distinct E2E ML configuration from the first E2E ML configuration, or can correspond to adjustments, tuning, refinements, and/or architecture updates to the first E2E ML configuration. The E2E ML controller 318 determines the second E2E ML configuration using any combination of information (e.g., endpoint participation modes, endpoint characteristics, link quality indications, performance requirements). As one example, the E2E ML controller 318 determines that the round-trip transfer latency characteristic between the ECS 180 and the base station 120 (and/or the core network server 302) statistically occurs at, or less than, 20 msec. Assuming again a round-trip latency time budget of 100 msec., the E2E ML controller 318 selects a second E2E ML configuration with an ML architecture that includes more layers and/or nodes relative to the first E2E ML configuration because the round-trip transfer latency characteristic allows for more processing (e.g., higher resolution, higher frame rate) by the corresponding E2E DNN.

In aspects, the E2E ML controller 318 partitions the second E2E ML configuration into portions and directs the participating devices to form DNNs for processing communications transferred through the E2E communication 604. As shown in FIG. 6, the base station 120 forms a fourth (local) DNN 614 based on a first partition of the second E2E ML configuration, where the DNN 614 communicates with the ECS 180 at interface 191 as further described. However, in alternative or additional implementations, the core network server 302 forms the fourth (local) DNN 614 and communicates with the ECS 180 at interface 192 (not illustrated in FIG. 6). In aspects, the DNN 614 routes communications between the base station 120 and the ECS 180, such as by generating communication packets to the ECS 180 and/or by receiving communication from the ECS 180 using a format supported the ECS 180 in a manner optimized for E2E communications.

The E2E ML controller 318 also updates the second DNN 608 based on a second partition of the second E2E ML configuration and the third DNN 612 based on a third partition of the second E2E ML configuration. In the E2E communication 604, the DNN 608 receives input from the local DNN 614 at interface 616 instead of the DNN 606 at interface 610, as illustrated for the E2E communication 602. The partitioning of the second E2E ML configuration as illustrated by the DNNs in the E2E communication 604 represents an example partitioning of functionality, and the E2E controller 318 can partition and distribute an E2E ML configuration (and corresponding E2E DNN) in other manners.

For clarity, the UE 110 and the base station 120 update and utilize a same DNN (e.g., DNN 612, DNN 608) for both the E2E communication 602 and the E2E communication 604. However, in alternative or additional implementations, the UE 110 and the base station 120 maintain separate DNNs for the different E2E communications.

Figure 7:
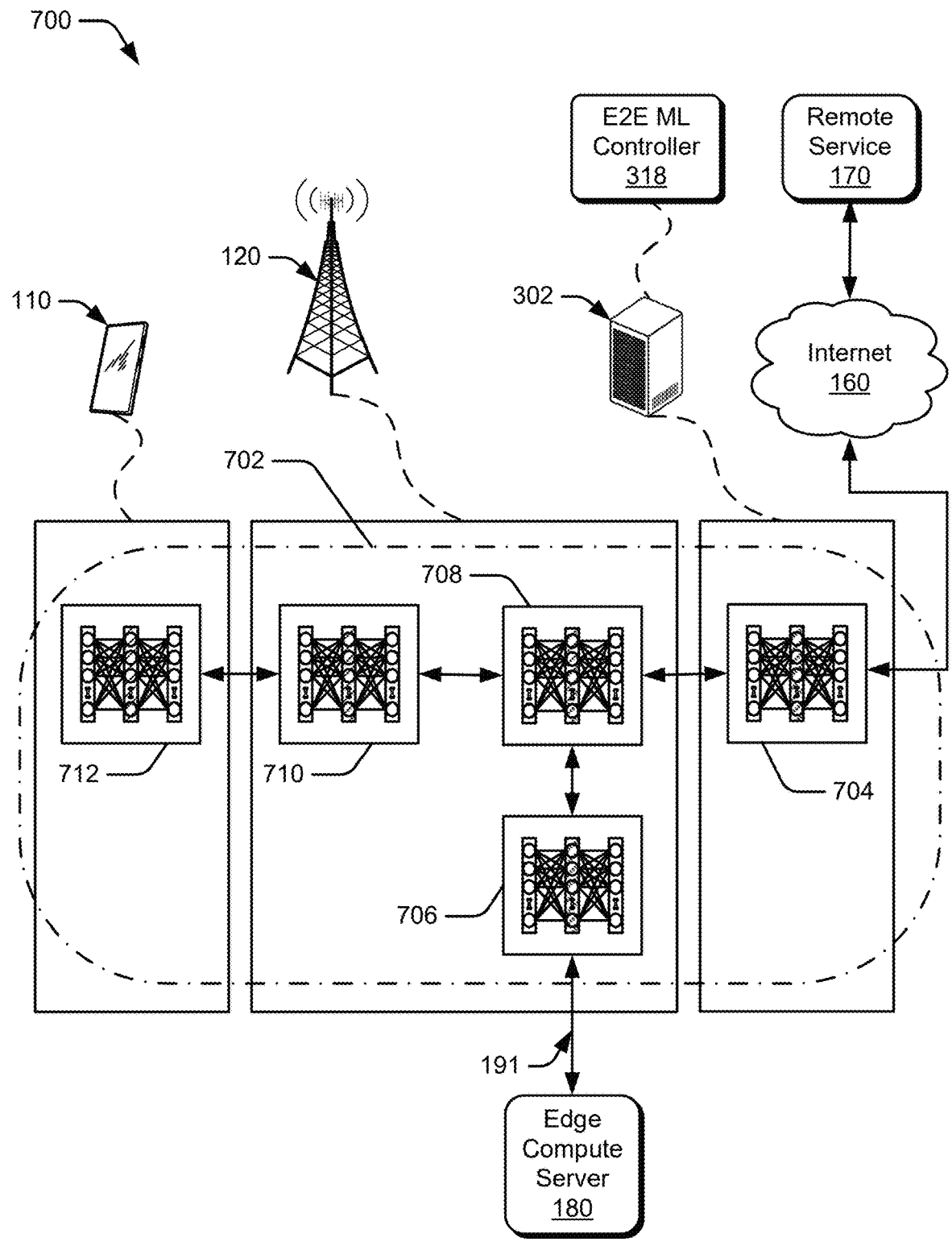
FIG. 7 illustrates another example operating environment in which E2E DNN adaptation for edge computing can be implemented in accordance with various aspects.

FIG. 7 illustrates an example environment 700 in which E2E DNN adaptation for edge computing can be implemented in accordance with various aspects. The environment 700 includes the UE 110, the base station 120, the remote service 170, and the ECS 180 of FIG. 1, and the core network server 302 of FIG. 3.

In the environment 700, the UE 110 acts as a first endpoint of an E2E communication 702, the remote service 170 acts as a second endpoint, and the ECS 180 acts as a third endpoint. In aspects, the E2E ML controller 318 determines an E2E ML configuration for forming an E2E DNN that aggregates and/or splits communications transferred between the UE 110 and the two other endpoints. While the E2E ML controller 318 determines an E2E ML configuration for a bi-directional E2E DNN, the E2E ML controller 318 can alternatively or additionally determine one or more E2E ML configurations for single-direction DNNs to aggregate and/or split downlink or uplink communications as further described.

The UE 110, the base station 120, and/or the core network server 302 form a distributed E2E DNN to process information and/or data transferred through the E2E communication 702, where the UE 110 uses both the remote service 170 and the ECS 180 to process application data. In aspects, the E2E ML controller 318 determines an E2E ML configuration for a distributed E2E DNN that splits communications from the UE 110 to the remote service 170 (through the Internet 160) and the ECS 180, then aggregates communications from the remote service 170 (through the Internet 160) and the ECS 180 to the UE 110. Similar to that described with reference to FIG. 6, the E2E ML controller 318 identifies the E2E ML configuration using any combination of information, such as prioritizations, a participation mode of the endpoints, end-point characteristics, link quality indications, performance requirements, available wireless network resources, ML capabilities of participating devices, a current operating environment, and so forth.

As one example, the E2E ML controller 318 analyzes device capabilities and directs the UE to form a DNN with fewer layers and a smaller kernel size relative to a DNN formed by the base station and/or the core network server based on processing constraints of the UE. Alternatively, or additionally, the E2E ML controller partitions the E2E ML configuration to form a neural network with an architecture (e.g., a convolutional neural network, a long short-term memory (LSTM) network, partially connected, fully connected) that processes information without exceeding memory constraints of the UE. In some instances, the E2E ML controller calculates whether a respective amount of computation performed at each device collectively meets a performance requirement corresponding to a latency budget and determines an E2E ML configuration designed to meet the performance requirement.

The environment 700 illustrates an example partitioning in which the E2E ML controller 318 partitions the E2E ML configuration (and the E2E DNN formed using the E2E ML configuration) into five portions. The core network server 302 forms a first DNN 704 using a first portion of the E2E ML configuration. The base station 120 forms a second DNN 706 using a second portion of the E2E ML configuration, a third DNN 708 using a third portion of the E2E ML configuration, and a fourth DNN 710 using a fourth portion of the E2E ML configuration. The UE 110 forms a fifth DNN 712 using a fifth portion of the E2E ML configuration. The partitioning and functionality illustrated by the DNNs 704, 706, 708, 710, and 712 represent an example partitioning of functionality and formation of a distributed E2E DNN. In alternative implementations, the E2E ML controller 318 partitions the E2E ML configuration in other manners. As one example, the E2E ML controller 318 partitions the E2E ML configuration to combine the processing described for DNN 706, the DNN 708, and the DNN 710 into a single DNN implemented at the base station 120. As a second example, the E2E ML controller 318 partitions the E2E ML configuration to include an additional DNN at the core network server 302 that receives input from the ECS 180 at interface 192 (not illustrated in FIG. 7), such as for mobility management associated with edge computing. To illustrate, the E2E ML controller 318 partitions the E2E DNN to offload computationally intensive operations at the base station 120 to the core network server (e.g., by way of DNN 704). Alternatively or additionally, the DNN 704 routes communications to and from the remote service by way of the internet, such as by generating network packets to send to the remote service 170 through the Internet and/or by receiving network packets from the remote service 170 in a manner optimized for E2E communications. Similarly, in some aspects, the DNN 706 routes communications between the base station 120 and the ECS 180, such as by generating communication packets to the ECS 180 and/or by receiving communication from the ECS 180 using a format supported the ECS 180 in a manner optimized for E2E communications.

For downlink communications, the DNN 704 receives a first input (e.g., application data) from the remote service 170, processes the first input, and generates a first output. Similarly, the DNN 706 receives a second input from the ECS 180 at interface 191, processes the second input, and generates a second output. The DNN 708 receives and processes the first and second outputs from the respective endpoints and generates an aggregated output that the DNN 710 receives and processes. The DNN 710 then communicates the corresponding results to the DNN 712.

For uplink communications, the DNN 712 at the UE 110 generates an output that the DNN 710 uses as input. Based on this input, the DNN 710 at the base station 120 generates a single output that is received by the DNN 708, which is also implemented at the base station 120. The DNN 708 generates a split output: a first output directed to DNN 704 at the core network server 302 (and subsequently the remote service 170 through the Internet 160) and a second output directed to the DNN 706 (and subsequently the ECS 180 at interface 191).

Determining an E2E ML configuration and adapting the E2E ML configuration based on one or more respective endpoint participation modes allows a network entity to dynamically change E2E DNN processing communications as a UE moves and endpoints of a corresponding E2E communication change. In some aspects, the network entity determines a partitionable E2E ML configuration to distribute processing of the E2E DNN and/or direct devices with fewer resources to form DNNs with less processing (e.g., less data, less memory, fewer CPU cycles, fewer nodes, fewer layers) relative to devices with more processing resources and/or memory. The dynamic adaptation and/or partitioning allow the network entity to modify the (distributed) E2E DNN based on the endpoints participating in an E2E communication and improve a performance of E2E communications with respect to one or more metrics, such as higher resolution, faster processing, lower bit errors, improved signal quality, improved latency, etc.

Signaling and Control Transactions for E2E DNN Adaptation for Edge Computing

Figure 8:
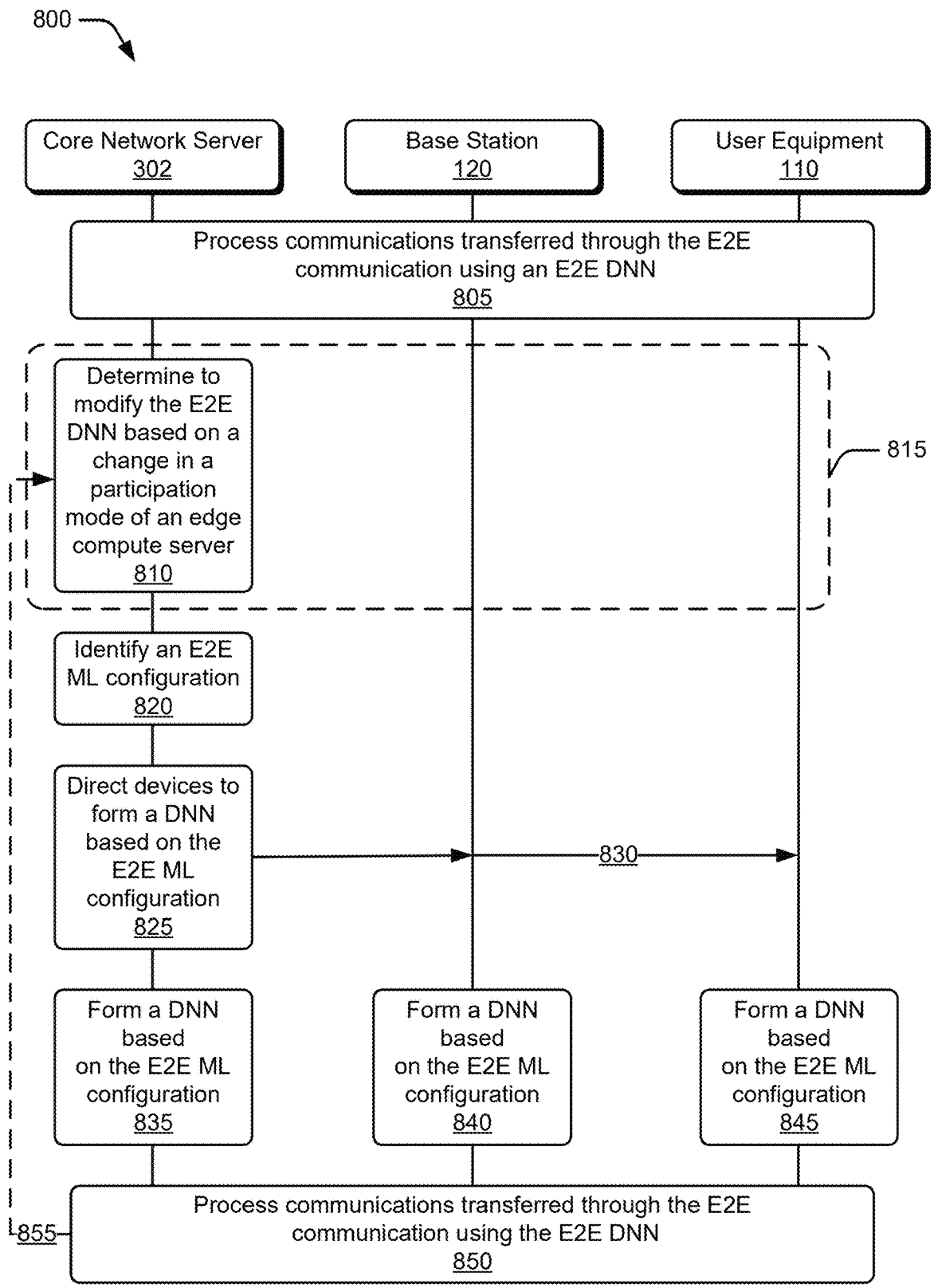
FIG. 8 illustrates an example transaction diagram between various network entities that implement E2E DNN adaptation for edge computing.
Figure 9:
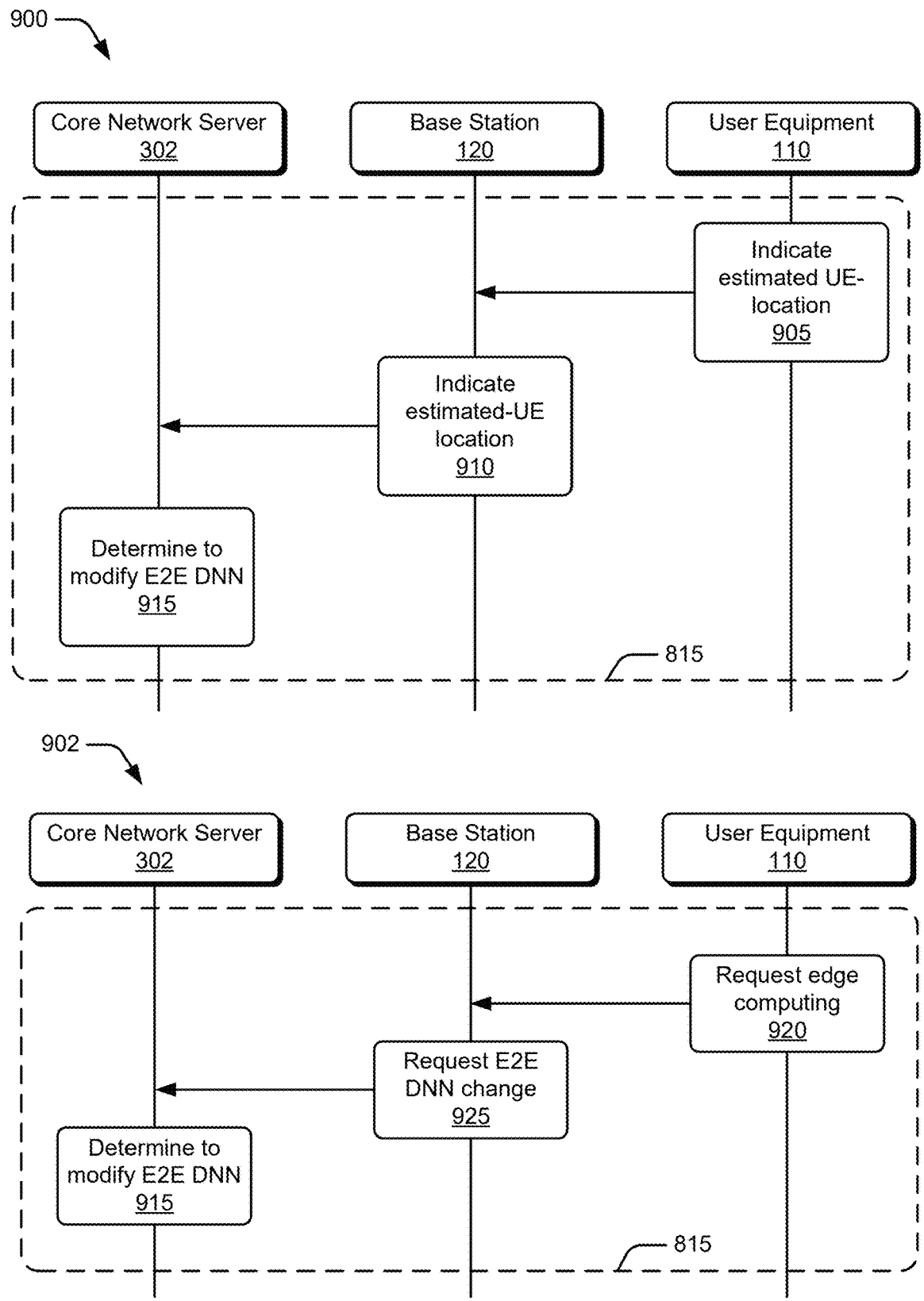
FIG. 9 illustrates other example transaction diagrams between various network entities that implement E2E DNN adaptation for edge computing.

FIGS. 8 and 9 illustrate example signaling and control transaction diagrams between a core network server, a base station, and a user equipment in accordance with one or more aspects of E2E DNN adaptation for edge computing. Operations of the signaling and control transactions may be performed by the base station 120 and the UE 110 of FIG. 1, or the core network server 302 of FIG. 3, using aspects as described with reference to any of FIGS. 1-7.

A first example of signaling and control transactions for E2E DNN adaptation for edge computing is illustrated by the signaling and control transaction diagram 800 of FIG. 8. As illustrated, at 805, the core network server 302, the base station 120, and the UE 110 process communications transferred through an E2E communication using an E2E DNN. In aspects, the E2E DNN corresponds to a distributed E2E DNN, such as those described with reference to FIGS. 6 and 7.

At 810, the core network server 302 determines to modify the E2E DNN based on a change in a participation mode of an ECS in the E2E communication. As one example, the core network server 302 receives a request or notification from the UE 110 and/or base station 120 to add the ECS to the E2E communication for application processing, as further described in FIG. 9. Accordingly, sub-diagram 815 generally denotes signaling and control transactions useful to determine when and how to modify the E2E DNN based on a change in an endpoint participation mode, and can include a variety of signaling and control transactions between the core network server 302, the base station 120, and/or the UE 110. The determination to modify the E2E DNN can be based on a change to add and utilize an ECS as described by the E2E communication 604, a change based on omitting the ECS as described by the E2E communication 602, or a change to aggregate communications with the ECS and communications with the remote service as described by the E2E communication 702.

At 820, the core network server 302, by way of the E2E ML controller 318, identifies or determines an E2E ML configuration based on the change in the participation mode of the ECS. To illustrate, the core network server 302 analyzes performance characteristics (e.g., latency characteristics), prioritizations, and/or performance requirements (e.g., latency budget) of an E2E communication based on the endpoints included in the change. Based on the participation mode of the ECS, the E2E ML controller 318 determines an E2E ML architecture, such as a number of included processing layers, a computation mode and/or configuration of each layer (e.g., down-sampling configuration, number of connected nodes, number of convolutional layers).

Alternatively, or additionally, the E2E ML controller 318 analyzes capabilities of devices participating in the E2E communication, such as UE capabilities. Sometimes the E2E ML controller analyzes wireless network resource partitioning associated with the E2E communication. As another example, the E2E ML controller 318 analyzes metrics that characterize a current operating environment and determines the E2E ML configuration based on the current operating environment. In implementations, the E2E ML configuration corresponds to a single-direction E2E communication for uplink or downlink data traffic, while in other implementations, the E2E communication corresponds to a bi-directional E2E communication for both uplink and downlink data traffic.

In identifying the E2E ML configuration, the core network server 302 sometimes analyzes neural network table(s) to obtain one or more neural network formation configurations that correspond to the E2E ML configuration. For instance, the core network server partitions the E2E ML configuration across multiple devices as described with reference to FIGS. 6 and 7 and determines a respective entry in the neural network table for each partition, where each entry indicates architecture and/or parameter configurations. Thus, the core network server 302 can determine a distributable E2E ML configuration that forms a distributable E2E DNN and determine the partitioning of the E2E ML configuration/E2E DNN for the devices participating in the E2E communication.

At 825, the core network server 302 directs the devices to form a DNN based on the E2E ML configuration identified at 820. For example, as described with reference to FIG. 6 and FIG. 7, the core network server 302 directs the base station 120 to form and/or update a first portion of an E2E DNN using a first portion of the E2E ML configuration and directs the UE 110 to form and/or update a second portion of the E2E DNN using a second portion of the E2E ML configuration. In some implementations, the core network server 302 directs the devices to form the respective DNNs by indicating an index into a neural network table, such as the neural network table 216 and/or the neural network table 272. At times, the base station 120 forwards the indication from the core network server 302 to the UE 110, as shown at 830.

At 835, the core network server 302 optionally forms a DNN (e.g., DNN 606, DNN 704) based on the E2E ML configuration identified at 820. In implementations, the DNN formed by the core network server performs at least some processing that transfers communications through the E2E communication, such as application data to/from the remote service 170. Similarly, at 840, the base station 120 forms and/or updates a DNN (e.g., DNN 608, DNN 614, DNN 706, DNN 708, DNN 710) based on the E2E ML configuration identified at 820. For instance, the base station 120 accesses a neural network table to obtain one or more parameters and/or an architecture as described with reference to FIG. 5. In implementations, the DNN formed by the base station 120 performs at least some processing that transfers application data through the E2E communication, such as application data transferred to/from the ECS 180, the aggregation and/or splitting of application data processed by the ECS 180 and the remote service 170, or application data transferred to/from the remote service 170. At 845, the UE 110 forms and/or updates a DNN (e.g., DNN 612, DNN 712) based on the E2E ML configuration determined at 820. For instance, the UE 110 accesses a neural network table to obtain one or more parameters and/or architectures as described with reference to FIG. 5. In implementations, the DNN formed by the UE 110 performs at least some processing that transfers information and/or data through the E2E communication of the wireless network.

Afterwards, at 850, the core network server 302, the base station 120, and/or the UE 110 process communications transferred through the E2E communication using the E2E DNN formed from the E2E ML configuration identified at 820. For example, with reference to FIG. 6, the DNNs process uplink and/or downlink transfer of application data processed by a remote service endpoint or an ECS. As another example, with reference to FIG. 7, the DNNs process uplink and/or downlink transfer of application data by aggregating, splitting, and/or routing data associated with both a remote service endpoint and an ECS.

In aspects, the core network server 302, base station 120, and/or the UE 110 iteratively perform the signaling and control transactions described in the signaling and control transaction diagram 800, signified in FIG. 8 with dashed line 855. These iterations allow the core network server 302, base station 120, and/or the UE 110 to dynamically adjust and/or switch the DNNs used to adapt an E2E communication as a participation mode of an ECS in the E2E communication changes, such as changes based on a UE moving. The adjustments can include architecture changes and/or parameter changes to the E2E DNN as further described.

A second example of signaling and control transactions for E2E DNN adaptation for edge computing is illustrated by the signaling and control transaction diagram 900 of FIG. 9. The diagram 900 provides example signaling and control transactions for performing sub-diagram 815 of FIG. 8.

At 905, the UE 110 indicates estimated-UE location information to the base station 120. As one example, the UE 110 transmits link quality indications to the base station 120, and the base station 120 generates the estimated-UE location, such as through power levels and/or timing information (e.g., time of arrival). As another example, the base station receives the estimated-UE location from the UE 110, such as by sending Global Positioning System (GPS) and/or Global Navigation Satellite System (GNSS) location information using a low-band channel (e.g., 700 MHz, 800 MHz).

At 910, the base station 120 indicates the estimated-UE location to the core network server 302. Alternatively, or additionally, the base station 120 indicates, to the core network server 302, an application invoked and/or executing at the UE as further described at 920. In some aspects, the base station 120 identifies an ECS server based on the estimated-UE location and requests, from the core network server 302, to include or add the ECS server to the E2E communication.

In response to receiving the request from the base station 120, the core network server 302 determines, at 915, to modify the E2E DNN based on the estimated-UE location. To illustrate, assume an existing E2E communication for the UE 110 includes a connection with a data center and/or remote service as further described. The core network server 302 determines, from the estimated-UE location, that the average round-trip latency between the data center and/or remote service and the UE at the estimated-UE location exceeds a round-trip latency budget. For example, the core network server 302 accesses historical data records that archive past round-trip latencies between other UEs at the estimated-UE location and the data center. Alternatively, or additionally, the core network server 302 determines, from the estimated-UE location, that the UE is positioned within a predetermined distance to an ECS and/or determines the average round-trip latency between the ECS and other UEs at the estimated-UE location. In aspects, the core network server 302 determines that the average round-trip latency associated with the ECS improves transfer latencies, then determines to add the ECS 180 to the E2E communication.

In response to determining to add the ECS 180 to the E2E communication, the core network server 302 determines to modify the E2E DNN, such as by forming an E2E DNN that routes application data to the ECS. Alternatively, or additionally, the core network server 302 determines to modify the E2E DNN to omit or exclude communications with the data center and/or the remote service from the E2E communication. In some aspects, the core network server 302 identifies an E2E ML configuration that forms the E2E DNN to aggregate and/or split communications between the UE, the data center, and the ECS as further described.

A third example of signaling and control transactions for E2E DNN adaptation for edge computing is illustrated by the signaling and control transaction diagram 902 of FIG. 9. The diagram 902 provides example signaling and control transactions for performing sub-diagram 815 of FIG. 8.

At 920, the UE 110 requests edge computing by transmitting the request to the base station 120. To illustrate, the UE 110 identifies the invocation of a data-intensive application and/or an application with low-latency requirements and requests mobile edge computing to service the application. In some aspects, the UE explicitly requests the addition of edge computing, while in others, the UE implicitly requests the addition of edge computing. For instance, the UE implicitly requests to include edge computing by transmitting an indication of the invoked application and/or data services utilized by the application.

At 925, in response to receiving the UE's request to add edge computing, the base station 120 requests an E2E DNN change from the core network server 302. In some aspects, the base station 120 determines, from the information indicated at 920, that an ECS connected to the base station supports processing for the invoked application and/or includes data services utilized by the application. The base station 120 then requests the change in the E2E DNN to add the ECS 180 to the E2E communication. In other aspects, the base station determines that the computing at the ECS 180 for the invoked application and/or data services has completed and requests the change in the E2E DNN to omit the ECS 180 from the E2E communication. In response to receiving the request and/or in response to determining to grant the request, at 920, the core network server 302 determines to modify the E2E DNN at 915 as further described.

Example Methods

Example methods 1000 and 1100 are described with reference to FIG. 10 and FIG. 11 in accordance with one or more aspects of E2E DNN adaptation for edge computing. The order in which the method blocks are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
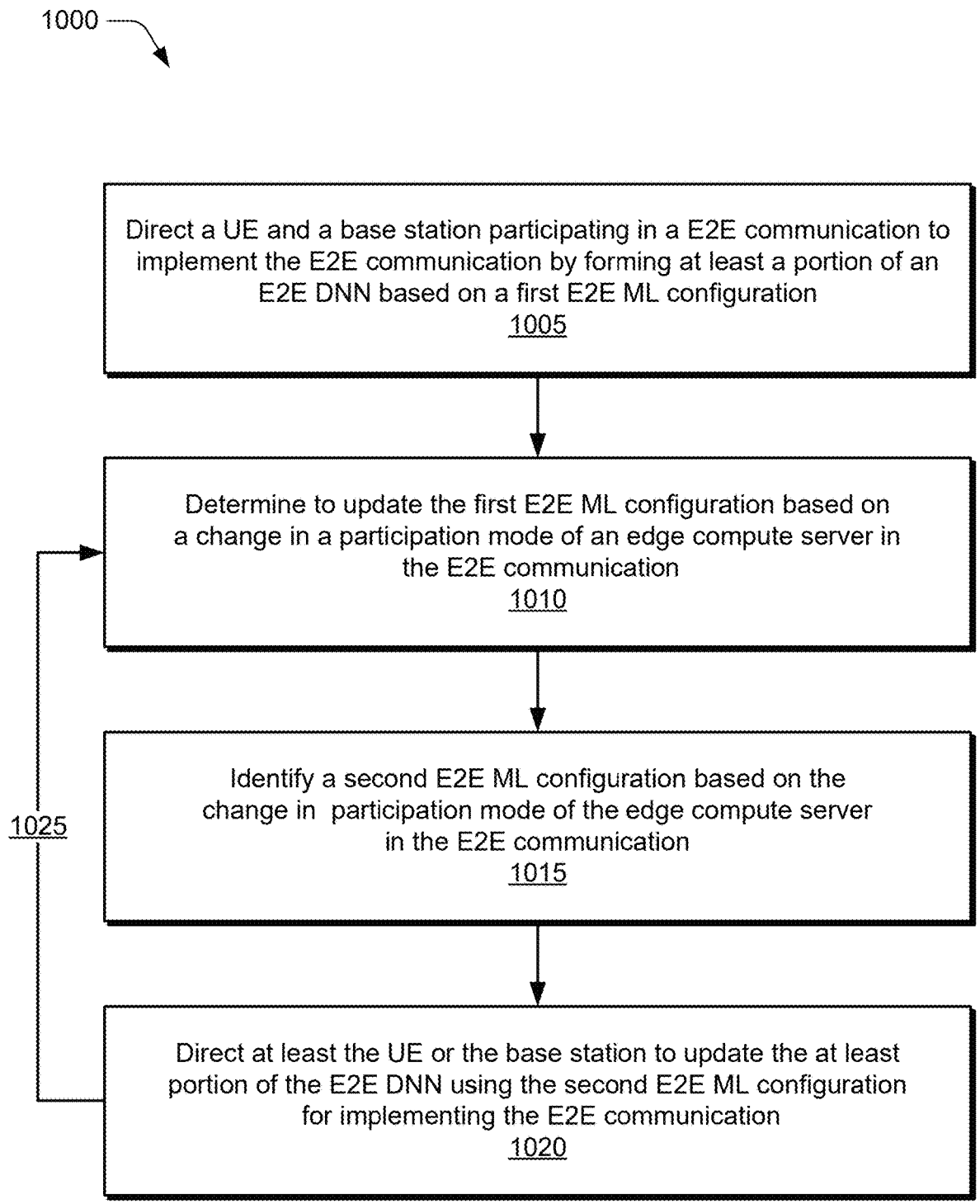
FIG. 10 illustrates an example method for E2E DNN adaptation for edge computing.

FIG. 10 illustrates an example method 1000 used to perform aspects of E2E DNN adaptation for edge computing. In some implementations, operations of the method 1000 are performed by a network entity, such as the core network server 302.

At 1005, the network entity directs a UE and a base station participating in an end-to-end (E2E) communication to implement the E2E communication by forming at least a portion of an E2E deep neural network (DNN) based on a first E2E ML configuration. For example, the network entity (e.g., core network server 302) directs the base station (e.g., base station 120) to form a first DNN using a first portion of an E2E machine-learning (ML) configuration and the UE (e.g., UE 110) to form a second DNN using a second portion of the E2E ML configuration as described at 805 of FIG. 8.

At 1010, the network entity determines to update the first E2E ML configuration based on a change in a participation mode of an ECS in the E2E communication. For example, the network entity (e.g., core network server 302) receives a request from the UE (e.g., UE 110) to add the ECS (e.g., ECS 180) as described at 925 and at 930 of FIG. 9. As another example, the network entity (e.g., core network server 302) receives a request from the base station (e.g., base station 120) for an endpoint participation mode change as described at 915 of FIG. 9. To illustrate, the network entity determines to update the first E2E ML configuration based on adding the ECS in the E2E communication, aggregating communications with the ECS and communications with the remote service in the E2E communication, or removing the remote service from the E2E communication. In some implementations, the network entity detects the change in the participation mode of the ECS, such as by receiving the request from the UE to add edge computing to the E2E communication or an indication from the base station that the ECS has been omitted from the E2E communication.

At 1015, the network entity identifies a second E2E ML configuration based on the change in the participation mode of the ECS in the E2E communication. For example, the network entity (e.g., core network server 302) identifies a second E2E ML configuration as described at 820 of FIG. 8. In identifying the second E2E ML configuration, the network entity sometimes determines partitioning that distributes the second E2E ML configurations across multiple devices. As one example, the network entity identifies, as at least part of the second E2E ML configuration, a downlink E2E ML configuration that forms a downlink E2E DNN directed to receive a first input from remote service, receive a second input from the ECS, aggregate the first input and second input to generate an output directed to the UE. Alternatively, or additionally, the network entity identifies, as at least part of the second E2E ML configuration, an uplink E2E ML configuration that forms an uplink E2E DNN directed to receive an input from the UE, generate, using the input, a first output directed to the ECS as a first endpoint of the E2E communication, and generate, using the input, a second output directed to the remote service as a second endpoint of the E2E communication. In identifying the second E2E ML configuration, the network entity identifies any combination of one or more parameter changes and/or architecture changes, such as coefficient change(s), a change to a number of processing layers, a change to a computation mode of at least one processing layer, and so forth.

At 1020, the network entity directs at least the UE or the base station to update the at least portion of the E2E DNN using the second E2E ML configuration for implementing the E2E communication. For example, the network entity (e.g., core network server 302) directs the base station (e.g., base station 120) to form a first DNN based on a first partition of the second ME configuration and the UE (e.g., UE 110) to form a second DNN based on a second partition of the second ML configuration as described at 825 of FIG. 8. In at least one example, the network entity sends a NAS message to the UE to indicate to update a DNN.

In some aspects, the method 1000 iteratively repeats as indicated at 1025. For example, assume the first iteration adds an ECS to the E2E communication as a UE (e.g., UE 110) enters into a coverage area that includes the ECS (e.g., ECS 180). A second iteration removes the ECS from the E2E communication as the UE moves out of the coverage area. This allows the network entity to dynamically adapt DNNs and how the DNNS process E2E communications to optimize (and re-optimize) the processing as endpoints in an E2E communication change.

Figure 11:
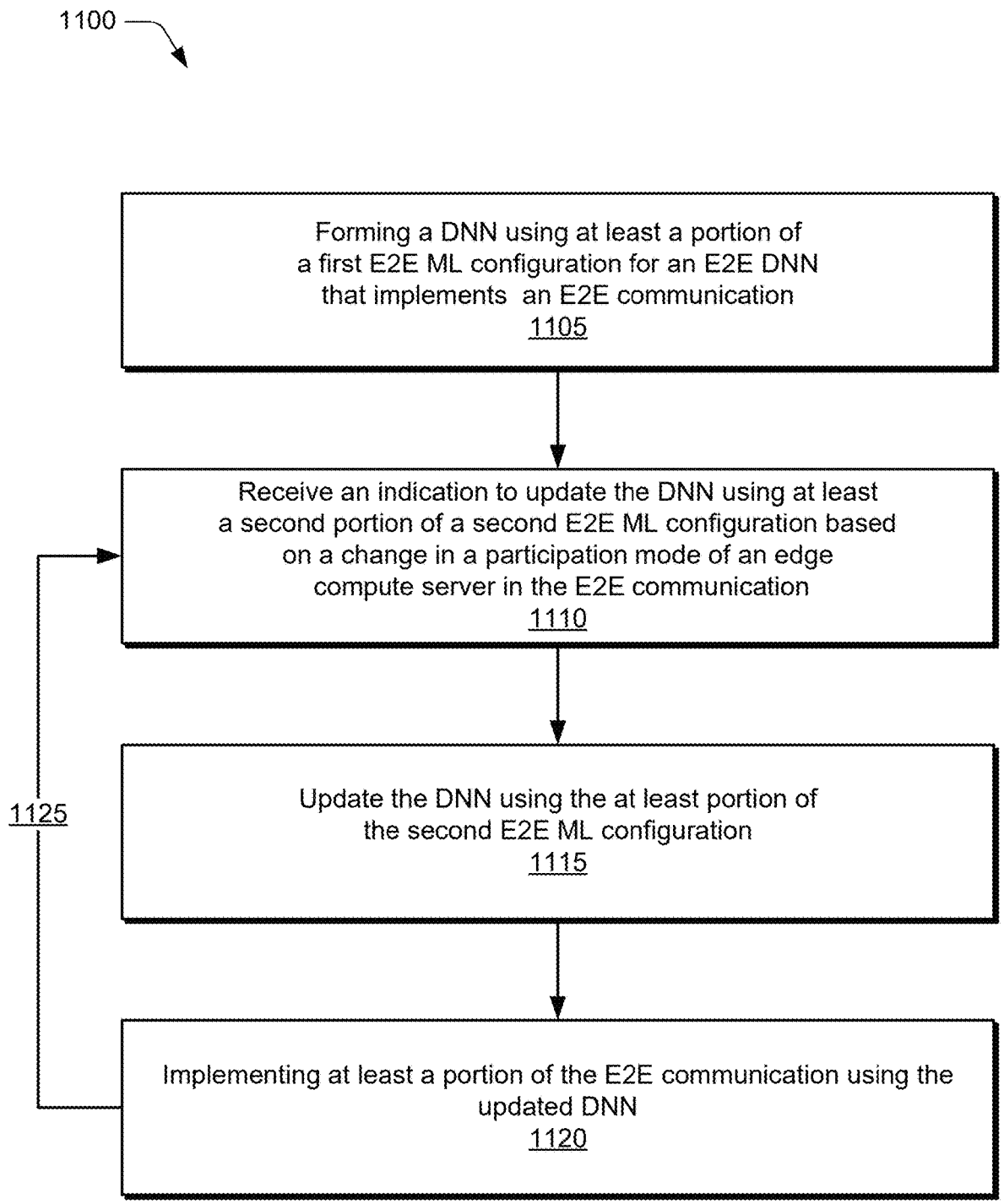
FIG. 11 illustrates another example method for E2E DNN adaptation for edge computing.

FIG. 11 illustrates an example method 1100 used to perform aspects of E2E DNN adaptation for edge computing. In some implementations, operations of the method 1100 are performed by a wireless transmit/receive unit (WTRU), such as a UE (e.g., UE 110) or a base station (e.g., BS 120).

At 1105, the WTRU forms a DNN using at least a first portion of a first E2E ML configuration for an E2E DNN that implements an E2E communication. For example, the WRTU (e.g., UE 110) forms the DNN (e.g., DNN 612, DNN 712) using at least a first portion of the first E2E ML configuration as described at 805 of FIG. 8. As another example, the WRTU (e.g., base station 120) forms the DNN (e.g., DNN 608, DNN 614, DNN 706, DNN 708, DNN 710) at least the first portion of the first E2E ML configuration.

At 1110, the WTRU receives an indication to update the DNN using at least a second portion of a second E2E ML configuration based on a change in a participation mode of an ECS in the E2E communication. For example, the WTRU (e.g., UE 110) receives an indication to update the DNN (e.g., DNN 612, DNN 712) as described at 830 of FIG. 8. In some aspects, the UE receives the indication in a NAS message. As another example, the WTRU (e.g., base station 120) receives an indication to update the DNN (e.g., DNN 608, DNN 614, DNN 706, DNN 708, DNN 710) as described at 825 of FIG. 8.

At 1115, the WTRU updates the DNN using the at least a second portion of the second E2E ML configuration. For example, the WTRU (e.g., UE 110) updates the DNN to form a DNN (e.g., DNN 612, DNN 712) that processes communications based on the change in the participation mode of the ECS in the E2E communication as described at 845 of FIG. 8. As another example, the WTRU (e.g., base station 120) updates the DNN to form a DNN (e.g., DNN 608, DNN 614, DNN 706, DNN 708, DNN 710) that processes communications based on the change in the participation mode of the ECS in the E2E communication as described at 840 of FIG. 8.

At 1120, the WTRU implements at least a portion of the E2E communication using the updated DNN. For example, the WTRU (e.g., UE 110, base station 120) processes communications transferred through the E2E communication using the updated DNN as described at 850 of FIG. 8.

In some aspects, the method 1100 iteratively repeats as indicated at 1125. For example, assume the first iteration forms a DNN that processes edge computing as the UE (e.g., UE 110) moves within a predetermined distance of an ECS (e.g., ECS 180). A second iteration removes edge computing as the UE moves away from the ECS and/or outside the predetermined distance. This allows the network entity to dynamically adapt DNNs and how the DNNs process communications to optimize (and re-optimize) the processing as endpoints in an E2E communication change.

Although techniques and devices for E2E DNN adaptation for edge computing have been described in language specific to features and/or methods, it is to be understood that the subject of the appended claims is not necessarily limited to the specific features or methods described. Rather, the specific features and methods are disclosed as example implementations of E2E DNN adaptation for edge computing.

In the following, several examples are described:

Example 1: A method performed by a network entity for adapting an end-to-end, E2E, machine-learning, ML, configuration that forms an E2E deep neural network, DNN, for processing communications transferred through an E2E communication between at least two endpoints, the E2E communication using a wireless network, the method comprising: directing a user equipment, UE, participating in the E2E communication to implement the E2E communication by forming at least a first portion of the E2E DNN based on a first E2E ML configuration; directing a base station participating in the E2E communication to implement the E2E communication by forming at least a second portion of the E2E DNN based on the first E2E ML configuration; determining to update the first E2E ML configuration based on a change in a participation mode of an edge compute server, ECS, in the E2E communication; identifying a second E2E ML configuration based on the change in participation mode of the ECS in the E2E communication; and directing at least the UE or the base station to update at least a third portion of the E2E DNN using the second E2E ML configuration for implementing the E2E communication.

Example 2: The method as recited in example 1, wherein determining to update the first E2E ML configuration comprises: determining to include the ECS in the E2E communication; and determining to update the first E2E ML configuration based on determining to include the ECS in the E2E communication.

Example 3: The method as recited in example 2, wherein determining to update the first E2E ML configuration based on determining to include the ECS further comprises: determining to update the first E2E ML configuration based on: aggregating communications with the ECS and communications with a remote service in the E2E communication; or excluding the remote service from the E2E communication.

Example 4: The method as recited in example 3, wherein determining to update the first E2E ML configuration comprises determining to update the first E2E ML configuration based on the aggregating, and wherein identifying the second E2E ML configuration comprises: identifying, as at least part of the second E2E ML configuration, a downlink E2E ML configuration that forms a downlink E2E DNN directed to: receive a first portion of application data from the ECS; receive a second portion of the application data from the remote service; and aggregate the first portion and the second portion to generate aggregated application data directed to the UE.

Example 5: The method as recited in example 3 or example 4, wherein determining to update the first E2E ML configuration comprises determining to update the first E2E ML configuration based on the aggregating, and wherein identifying the second E2E ML configuration comprises: identifying, as at least part of the second E2E ML configuration, an uplink E2E ML configuration that forms an uplink E2E DNN directed to: receive uplink application data from the UE; generate, using the uplink application data, a first output directed to the ECS; and generate, using the uplink application data, a second output directed to the remote service. Example 6: The method as recited in any one of the preceding examples, wherein determining to update the first E2E ML configuration further comprises: receiving a request from the UE to include the ECS in the E2E communication; or determining to include the ECS in the E2E communication based on an estimated-UE location.

Example 7: The method as recited in example 6, wherein receiving the request from the UE to include the ECS in the E2E communication further comprises: receiving an implicit request to include the ECS in the E2E communication.

Example 8: The method as recited in any one of the preceding examples, wherein directing at least the UE or the base station to update the at least a third portion of the E2E DNN using the second E2E ML configuration further comprises: directing the UE to update the first portion of the E2E DNN using the second E2E ML configuration; or directing the base station to update the second portion of the E2E DNN using the second E2E ML configuration.

Example 9: The method in any one of the preceding examples, wherein identifying the second E2E ML configuration comprises at least one of: identifying one or more parameter changes to the E2E DNN; or identifying one or more architecture changes to the E2E DNN.

Example 10: The method as recited in example 9, wherein identifying the one or more parameter changes further comprises: identifying one or more coefficient changes.

Example 11: The method as recited in any one of the preceding examples, wherein directing at least the UE or the base station to update the at least a third portion of the E2E DNN further comprises: sending a non-access stratum message to the UE that indicates to update the at least a third portion of the E2E DNN.

Example 12: A method performed by a wireless transmit/receive unit, WTRU, for adapting an end-to-end, E2E, machine-learning, ML, configuration for processing communications transferred through an E2E communication in a wireless network, the method comprising: forming a deep neural network, DNN, using at least a first portion of a first E2E ML configuration for an E2E DNN that implements an E2E communication; receiving an indication to update the DNN using at least a second portion of a second E2E ML configuration based on a change in a participation mode of an edge compute server, ECS, in the E2E communication; updating the DNN using the at least a second portion of the second E2E ML configuration; and implementing at least a portion of the E2E communication using the updated DNN.

Example 13: The method as recited in example 12, further comprising: identifying, based on an estimated-UE location of the UE, the edge computing server; and requesting to include the ECS in the E2E communication.

Example 14: The method as recited in example 12 or example 13, wherein receiving the indication to update the DNN further comprises: receiving, as the indication, directions to update one or more parameters of the DNN; or receiving, as the indication, directions to update an architecture of the DNN.

Example 15: The method as recited in example 14, wherein receiving directions to update the architecture further comprises at least one of: changing a number of processing layers used in the DNN; changing a computation mode of at least one processing layer in the DNN.

Example 16: The method as recited in example 15, wherein changing the number of processing layers comprises: adding one or more convolutional layers to the DNN.

Example 17: The method as recited in any one of examples 14 to 16, wherein receiving directions to update the one or more parameters further comprises: receiving directions to update one or more coefficient of the at least a portion of the DNN.

Example 18: The method as recited in any one of examples 12 to 17, wherein the WTRU comprises a user equipment, UE, and wherein receiving the indication to update the DNN further comprises: receiving the indication from a base station.

Example 19: A network entity comprising: a processor; and computer-readable storage media comprising instructions that implement an end-to-end machine-learning controller for performing any one of the methods of examples 1 to 11.

Example 20: A user equipment comprising: a processor; and computer-readable storage media comprising instructions, responsive to execution by the processor, for directing the user equipment to perform one of the methods of examples 12 to 18.

Example 21: A base station comprising: a processor; and computer-readable storage media comprising instructions, responsive to execution by the processor, for directing the base station to perform one of the methods of examples 12 to 18.

Example 22: A computer readable medium comprising instructions which, when executed by a processor, cause: a network entity comprising the processor to perform any one of the methods of examples 1 to 11; a user equipment comprising the processor to perform any one of the methods of examples 12 to 18; and/or a base station comprising the processor to perform any one of the methods of examples 12 to 18.

What is claimed is:

1. A method performed by a network entity for adapting an end-to-end (E2E) machine-learning (ML) configuration that forms an E2E deep neural network (DNN), by determining adjustments to one or more E2E ML configurations, for processing communications transferred through an E2E communication between at least two endpoints, the E2E communication using a wireless network, the method comprising:
   directing a user equipment (UE) participating in the E2E communication to implement the E2E communication by forming at least a first portion of the E2E DNN based on a first E2E ML configuration;
   directing a base station participating in the E2E communication to implement the E2E communication by forming at least a second portion of the E2E DNN based on the first E2E ML configuration;
   determining to update the first E2E ML configuration based on a change in a participation mode of an edge compute server (ECS) in the E2E communication;
   identifying a second E2E ML configuration based on the change in participation mode of the ECS in the E2E communication; and
   directing at least the UE or the base station to update at least a third portion of the E2E DNN using the second E2E ML configuration for implementing the E2E communication.

2. The method as recited in claim 1, wherein the determining to update the first E2E ML configuration comprises:
   determining to include the ECS in the E2E communication; and
   determining to update the first E2E ML configuration based on determining to include the ECS in the E2E communication.

3. The method as recited in claim 2, wherein the determining to update the first E2E ML configuration based on determining to include the ECS further comprises:
   determining to update the first E2E ML configuration based on:
      aggregating communications with the ECS and communications with a remote service in the E2E communication; or
      excluding the remote service from the E2E communication.

4. The method as recited in claim 3, wherein the determining to update the first E2E ML configuration comprises determining to update the first E2E ML configuration based on the aggregating, and
   the identifying the second E2E ML configuration comprises:
      identifying, as at least part of the second E2E ML configuration, a downlink E2E ML configuration that forms a downlink E2E DNN directed to:
         receive a first portion of application data from the ECS;
         receive a second portion of the application data from the remote service; and
         aggregate the first portion and the second portion to generate aggregated application data directed to the UE.

5. The method as recited in claim 3, wherein the determining to update the first E2E ML configuration comprises determining to update the first E2E ML configuration based on the aggregating, and
   wherein the identifying the second E2E ML configuration comprises:
      identifying, as at least part of the second E2E ML configuration, an uplink E2E ML configuration that forms an uplink E2E DNN directed to:
         receive uplink application data from the UE;
         generate, using the uplink application data, a first output directed to the ECS; and
         generate, using the uplink application data, a second output directed to the remote service.

6. The method as recited in claim 1, wherein the determining to update the first E2E ML configuration further comprises:
   receiving a request from the UE to include the ECS in the E2E communication; or
   determining to include the ECS in the E2E communication based on an estimated-UE location.

7. The method as recited in claim 1, wherein the directing at least the UE or the base station to update the at least a third portion of the E2E DNN using the second E2E ML configuration further comprises:
  directing the UE to update the first portion of the E2E DNN using the second E2E ML configuration; or
  directing the base station to update the second portion of the E2E DNN using the second E2E ML configuration.

8. The method in in claim 1, wherein the identifying of the second E2E ML configuration comprises at least one of:
  identifying one or more parameter changes to the E2E DNN; or
  identifying one or more architecture changes to the E2E DNN.

9. A method performed by a wireless transmit/receive unit (WTRU) for adapting an end-to-end (E2E) machine-learning (ML) configuration, by determining adjustments to one or more E2E ML configurations, for processing communications transferred through an E2E communication in a wireless network, the method comprising:
  forming, based on a first E2E ML configuration identified by a network entity, at least a first portion of an E2E deep neural network (DNN) that implements an E2E communication;
  receiving an indication to update the E2E DNN using at least a second portion of a second E2E ML configuration based on a change in a participation mode of an edge compute server (ECS) in the E2E communication;
  updating the E2E DNN using the at least a second portion of the second E2E ML configuration; and
  implementing at least a portion of the E2E communication using the updated E2E DNN.

10. The method as recited in claim 9, further comprising:
  identifying, based on an estimated-UE location of the WTRU, the edge computing server; and
  requesting to include the ECS in the E2E communication.

11. The method as recited in claim 9, wherein the receiving of the indication to update the E2E DNN further comprises:
  receiving, as the indication, directions to update one or more parameters of the DNN; or
  receiving, as the indication, directions to update an architecture of the DNN.

12. The method as recited in claim 11, wherein the receiving of the directions to update the architecture further comprises at least one of:
  changing a number of processing layers used in the E2E DNN; and
  changing a computation mode of at least one processing layer in the E2E DNN.

13. A network entity for adapting an end-to-end (E2E) machine-learning (ML) configuration that forms an E2E deep neural network (DNN), by determining adjustments to one or more E2E ML configurations, for processing communications transferred through an E2E communication between at least two endpoints, the E2E communication using a wireless network, the network entity comprising:
  a processor; and
  computer-readable storage media comprising instructions, executable by the processor to implement an end-to-end machine-learning controller to:
    direct a user equipment (UE) participating in an end-to-end (E2E) communication to implement the E2E communication by forming at least a first portion of an E2E deep neural network (DNN) based on a first E2E machine-learning (ML) configuration;
    direct a base station participating in the E2E communication to implement the E2E communication by forming at least a second portion of the E2E DNN based on the first E2E ML configuration;
    determine to update the first E2E ML configuration based on a change in a participation mode of an edge compute server (ECS) in the E2E communication;
    identify a second E2E ML configuration based on the change in participation mode of the ECS in the E2E communication; and
    direct at least the UE or the base station to update at least a third portion of the E2E DNN using the second E2E ML configuration for implementing the E2E communication.

14. A user equipment for adapting an end-to-end (E2E) machine-learning (ML) configuration, by determining adjustments to one or more E2E ML configurations, for processing communications transferred through an E2E communication in a wireless network, the user equipment comprising:
  a processor; and
  computer-readable storage media comprising instructions, executable by the processor, to configure the user equipment to:
    form, based on a first end-to-end (E2E) ML configuration identified by a network entity, at least a first portion of an E2E deep neural network (DNN) that implements an E2E communication;
    receive an indication to update the E2E DNN using at least a second portion of a second E2E machine-learning (ML) configuration based on a change in a participation mode of an edge compute server (ECS) in the E2E communication;
    update the E2E DNN using the at least a second portion of the second E2E ML configuration; and
    implement at least a portion of the E2E communication using the updated E2E DNN.

15. A base station for adapting an end-to-end (E2E) machine-learning (ML) configuration, by determining adjustments to one or more E2E ML configurations, for processing communications transferred through an E2E communication in a wireless network, the base station comprising:
  a processor; and
  computer-readable storage media comprising instructions, executable by the processor, to configure the base station to:
    form, based on a first end-to-end (E2E) ML configuration identified by a network entity, at least a first portion of an E2E DNN that implements an E2E communication;
    receive an indication to update the DNN using at least a second portion of a second E2E machine-learning (ML) configuration based on a change in a participation mode of an edge compute server (ECS) in the E2E communication;
    update the E2E DNN using the at least a second portion of the second E2E ML configuration; and
    implement at least a portion of the E2E communication using the updated E2E DNN.

16. The base station as recited in claim 15, wherein the instructions are further executable by the processor to direct the base station to:
  identify, based on an estimated-UE location of the base station, the edge computing server; and
  request to include the ECS in the E2E communication.

17. The network entity as recited in claim 13, wherein the instructions to determine to update the first E2E ML configuration are further executable to configure the end-to-end machine-learning controller to:
  determine to include the ECS in the E2E communication; and
  determine to update the first E2E ML configuration based on determining to include the ECS in the E2E communication.

18. The network entity as recited in claim 17, wherein the instructions to determine to update the first E2E ML configuration, based on the determination to include the ECS, are further executable to configure the end-to-end machine-learning controller to:
  determine to update the first E2E ML configuration based on:
    aggregating communications with the ECS and communications with a remote service in the E2E communication; or
    excluding the remote service from the E2E communication.

19. The network entity as recited in claim 18, wherein the instructions to determine to update the first E2E ML configuration are executable to configure the end-to-end machine-learning controller to determine to update the first E2E ML configuration based on the aggregating, and
  the instructions to identify the second E2E ML configuration are further executable to configure the end-to-end machine-learning controller to:
    identify, as at least part of the second E2E ML configuration, a downlink E2E ML configuration that forms a downlink E2E DNN directed to:
      receive a first portion of application data from the ECS;
      receive a second portion of the application data from the remote service; and
      aggregate the first portion and the second portion to generate aggregated application data directed to the UE.

20. The user equipment as recited in claim 14, wherein the instructions are further executable by the processor to direct the user equipment to:
  identify, based on an estimated-UE location of the user equipment, the edge computing server; and
  request to include the ECS in the E2E communication.

* * * * *